United States Patent [19]

Rose

[11] 3,758,835

[45] Sept. 11, 1973

[54] STANDARDIZED CONTROL SECTIONS FOR MACHINE CONTROL SYSTEMS

[75] Inventor: Robert Frederick Rose, Rockford, Ill.

[73] Assignee: Dixon Automatic Tool, Inc., Rockford, Ill.

[22] Filed: Nov. 1, 1971

[21] Appl. No.: 194,708

[52] U.S. Cl.................. 318/162, 318/568, 318/569, 235/151.11
[51] Int. Cl. .......................................... G05b 19/42
[58] Field of Search.................... 318/569, 162, 568; 235/151.11

[56] References Cited
UNITED STATES PATENTS

| | | | |
|---|---|---|---|
| 3,559,188 | 1/1971 | Proctor...................... | 235/151.11 X |
| 3,400,677 | 9/1968 | Bowers ....................... | 318/162 X |
| 3,634,662 | 11/1972 | Slawson ......................... | 318/568 X |
| 3,317,894 | 5/1967 | Jensen ............................ | 318/569 X |
| 3,564,957 | 2/1971 | Markgraf....................... | 318/162 X |
| 3,504,245 | 3/1970 | Cotton et al....................... | 318/569 |
| 3,321,744 | 5/1967 | Jensen ............................ | 318/569 X |

*Primary Examiner*—B. Dobeck
*Attorney*—C. Frederick Leydig et al.

[57] ABSTRACT

A set of standardized control sections interconnectable to form controls for machines having motion producing components operable in a predetermined sequence in the presence of predetermined interlock conditions to perform work functions. The set of standardized control sections includes a standard master section which determines the mode of operation and initiates each machine cycle and a plurality of standard unit sections, each standard unit section controlling a corresponding motion producing component and generating feedback signals for indicating the successful completion of a work function by the corresponding component; the standard master section initiates a new machine cycle when the feedback signals indicate that the components have successfully completed their work functions. Each standard unit section has associated with it means for determining the position of its corresponding component and the progress of the machine cycle and for generating interlock signals indicative of that position and progress to control the generation of the feedback signals and the operation of the motion producing components so that the components operate in the predetermined sequence and only in the presence of the predetermined interlock conditions; each standard unit section further includes auxiliary circuitry for connecting interlock signals to various standard unit sections. The set of standardized control sections additionally includes specialized standard sections for controlling or monitoring special machine components or functions. This set of standardized control sections is adaptable to be assembled into particularly reliable and compact machine controls that are extremely flexible to control large numbers of machines with little or no engineering design and easily maintained and easily altered if the motion producing components in the machine or the sequence of operations are changed.

20 Claims, 21 Drawing Figures

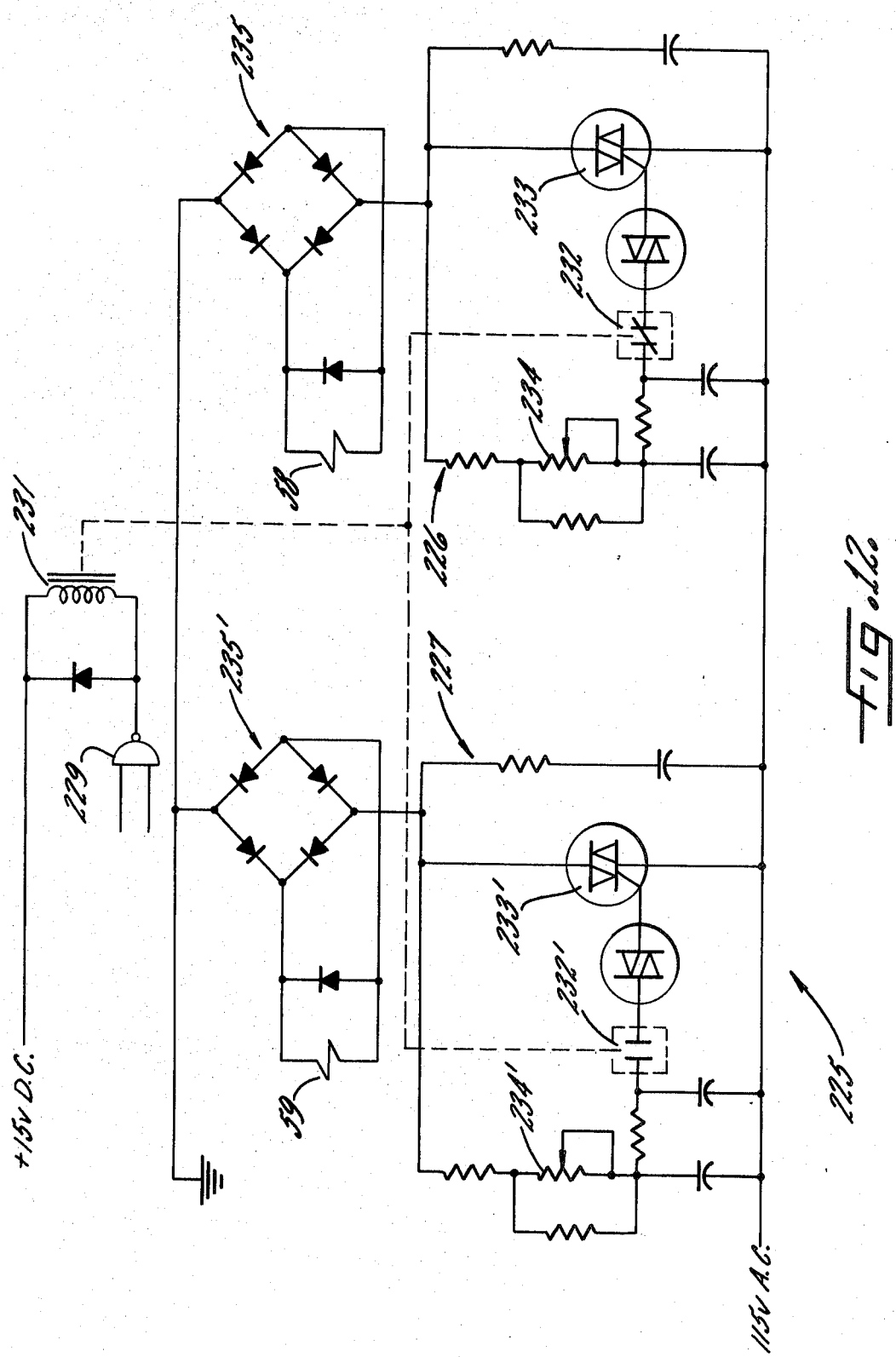

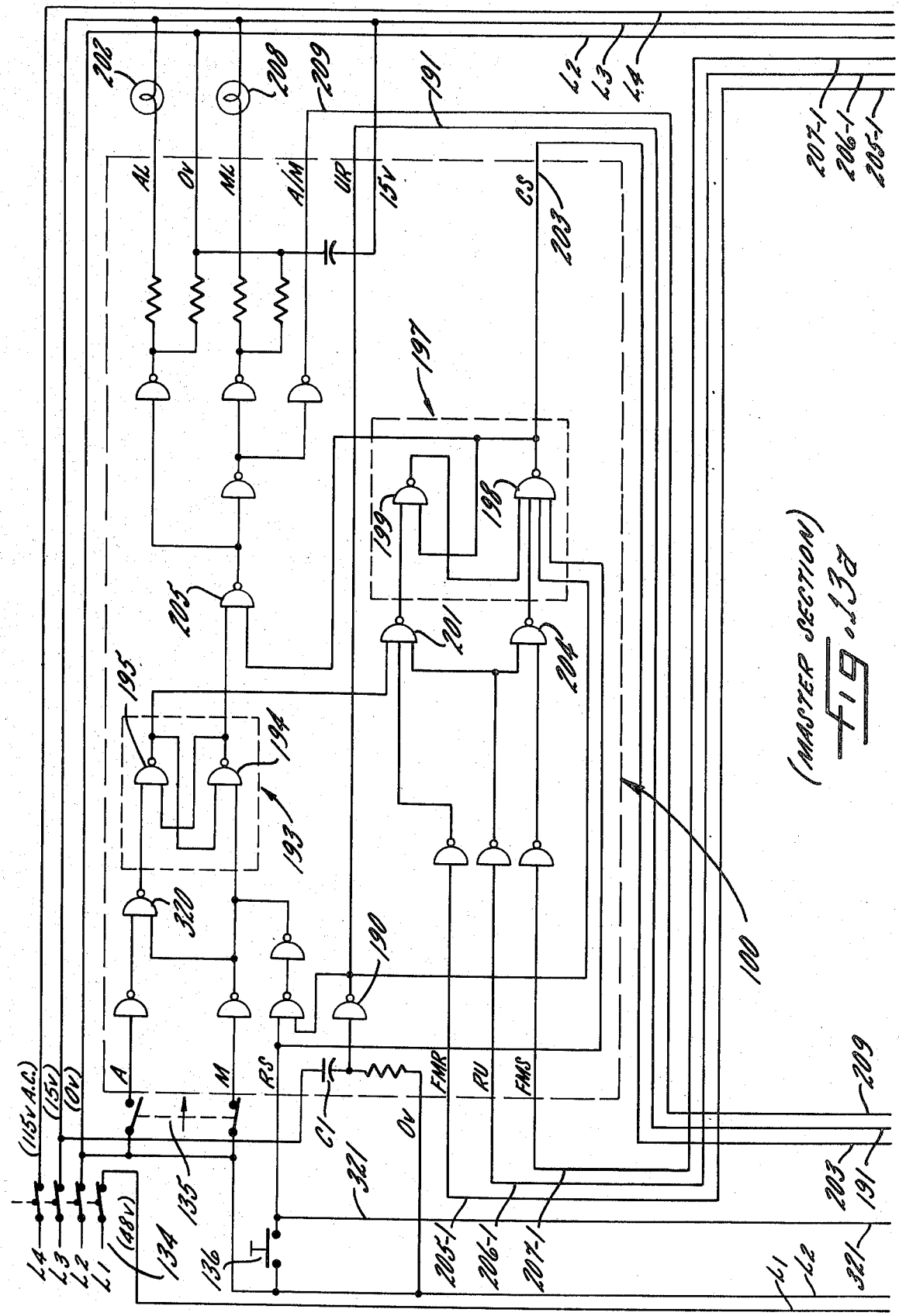

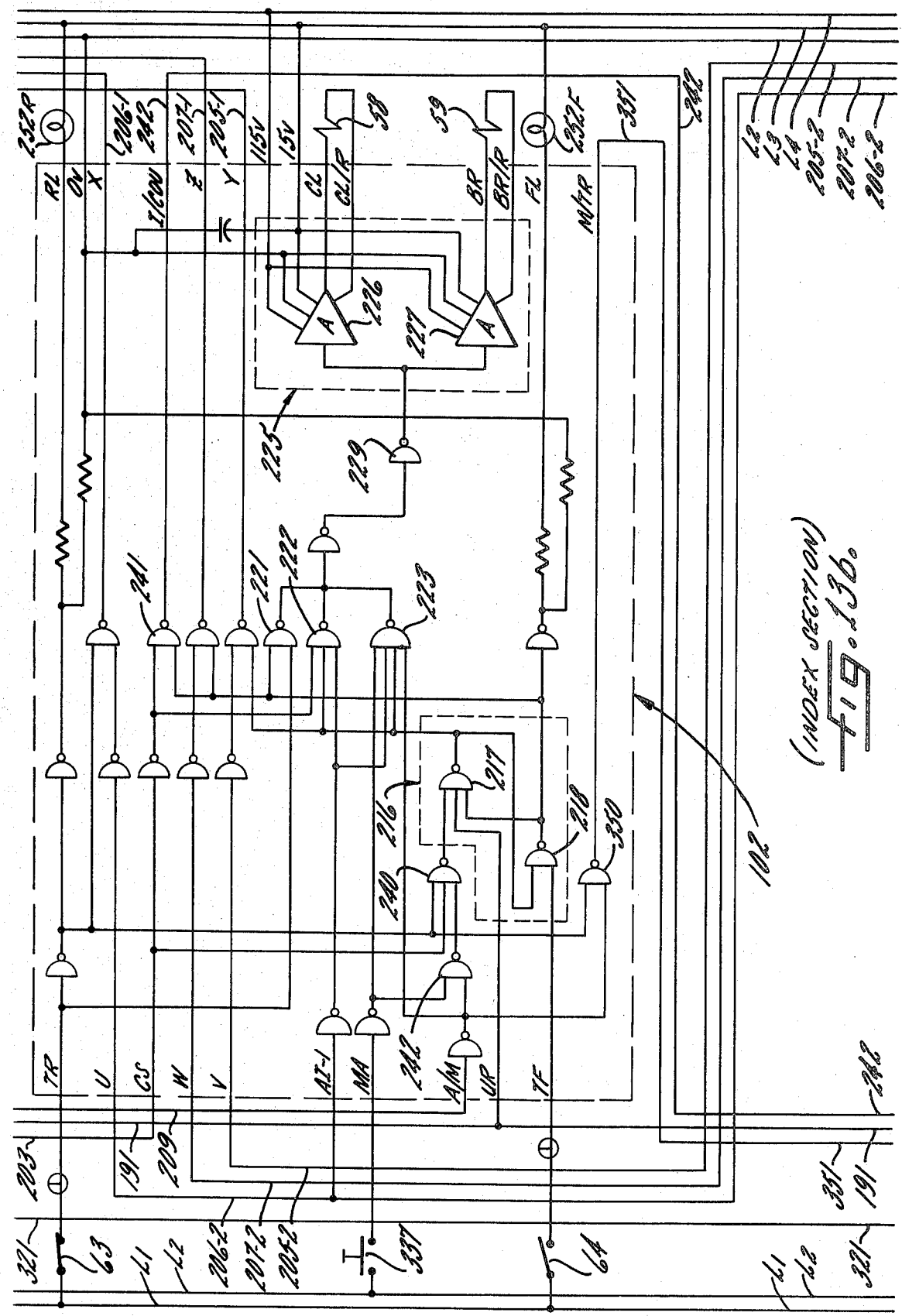

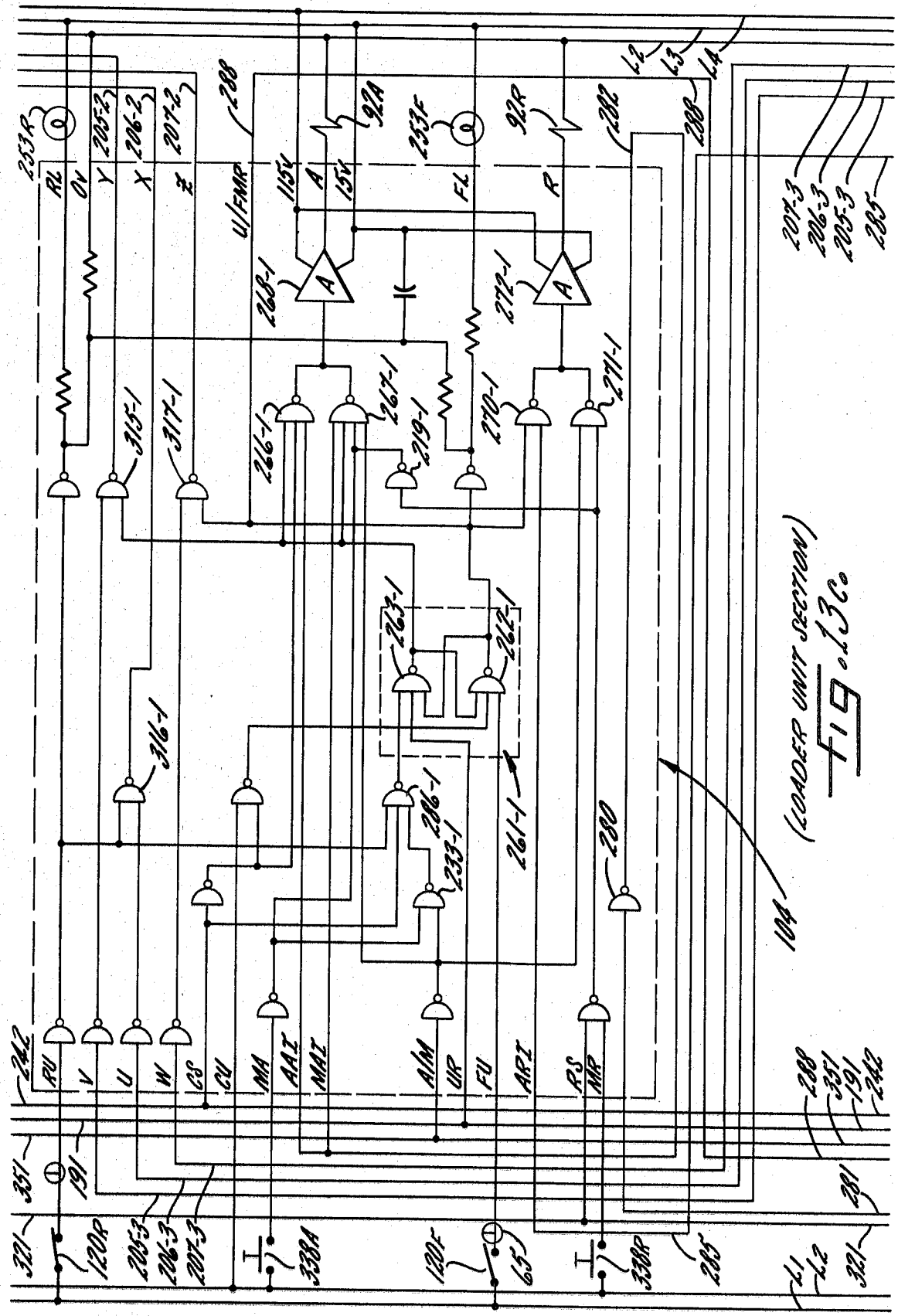

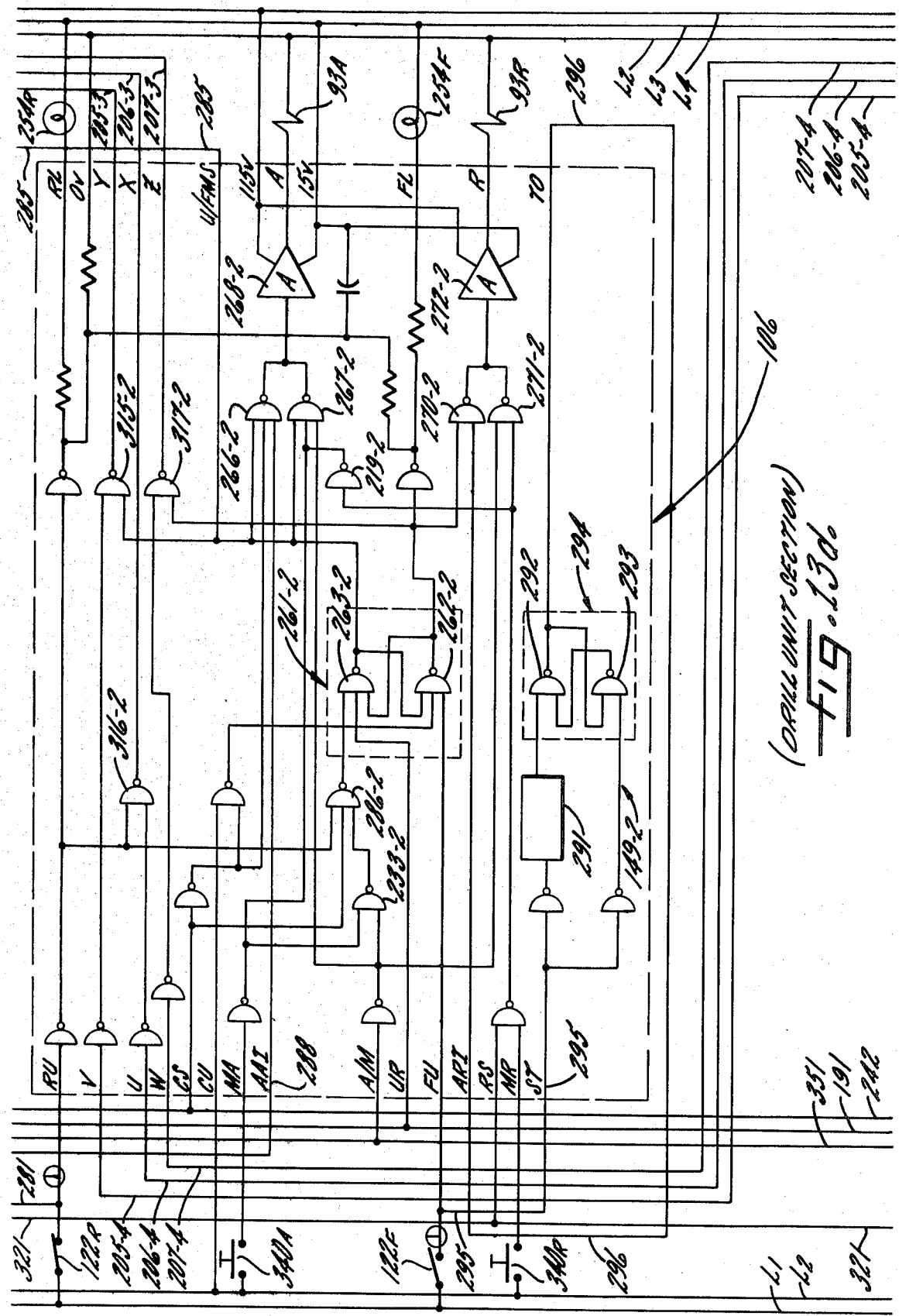
Fig. 13d (DRILL UNIT SECTION)

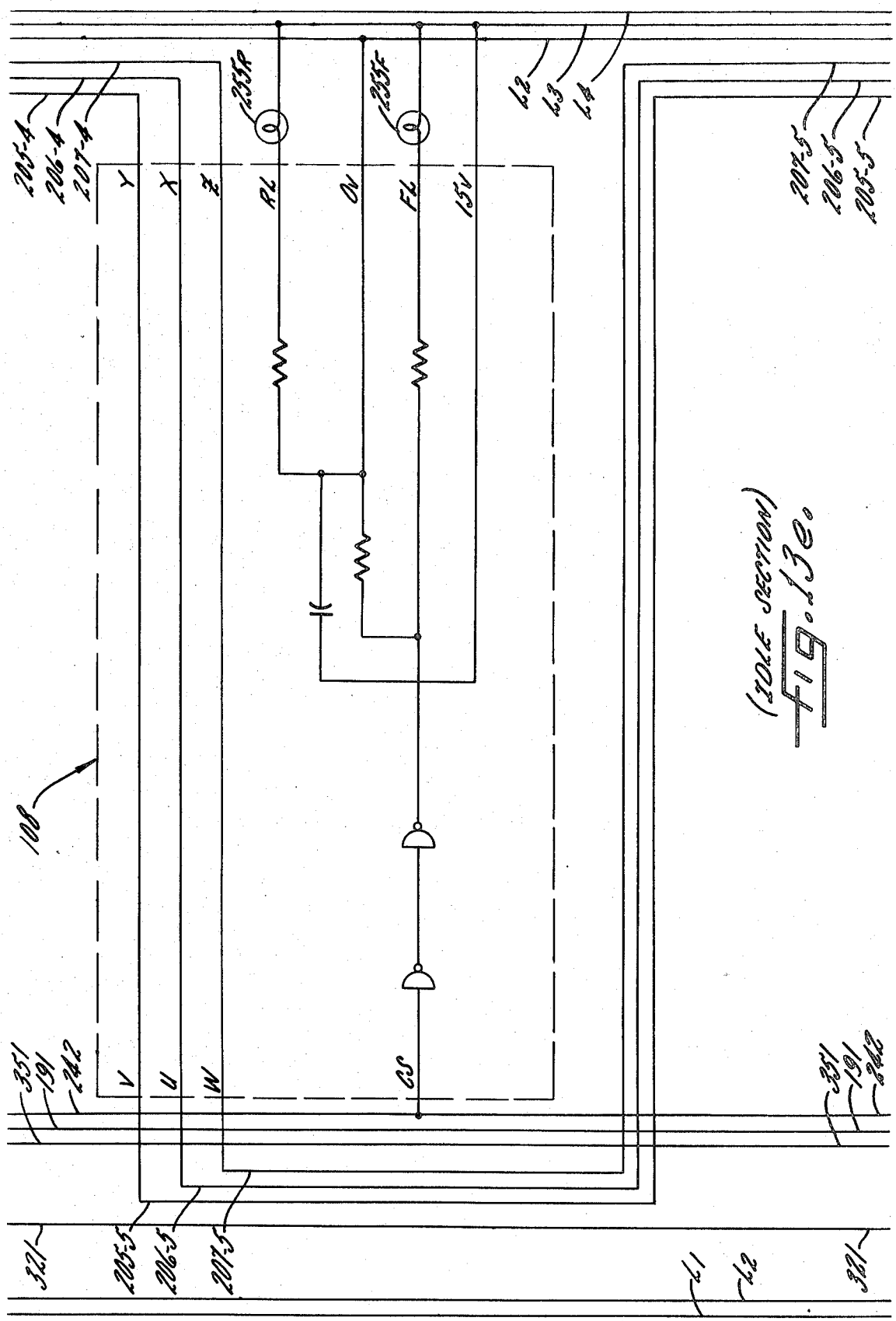

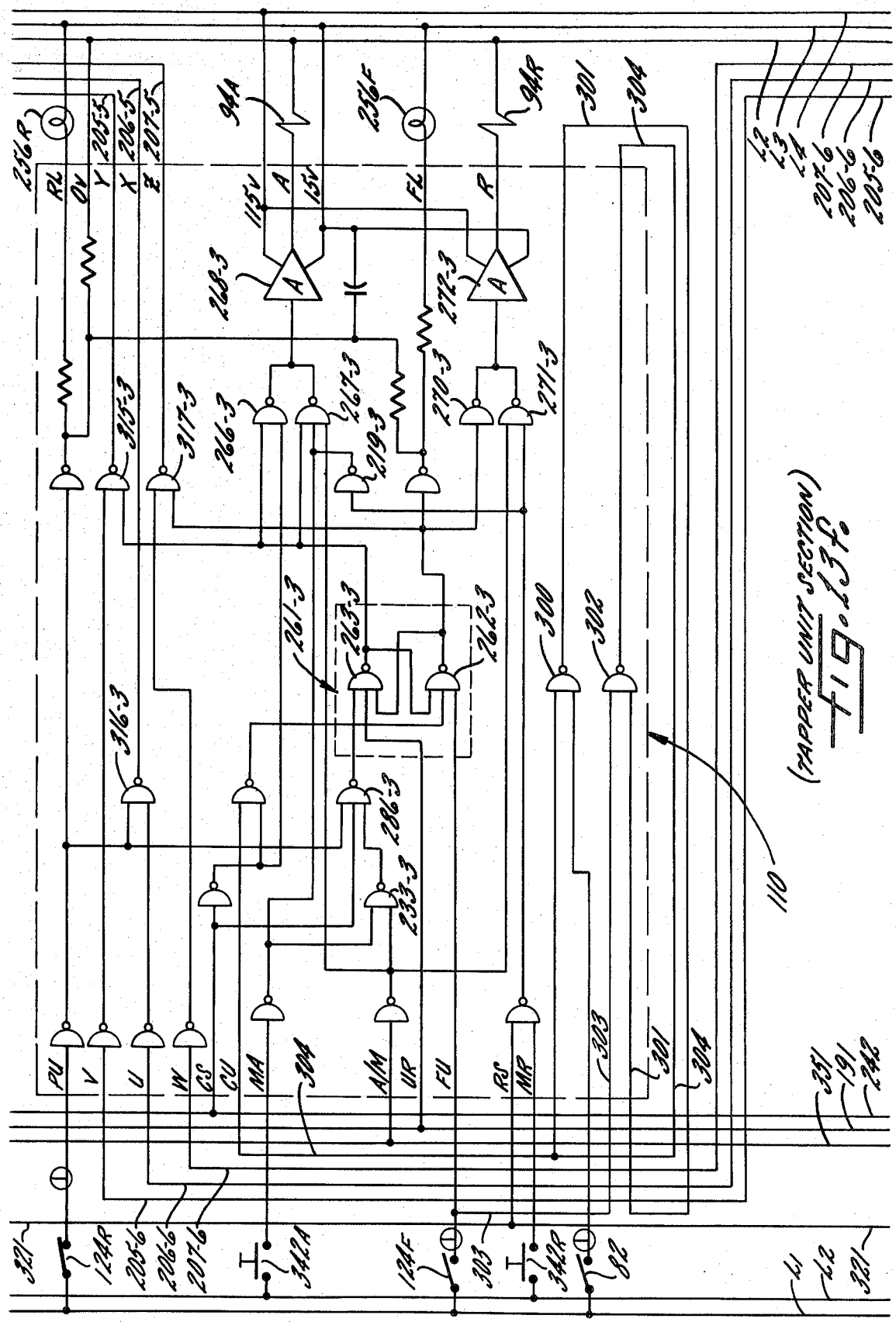

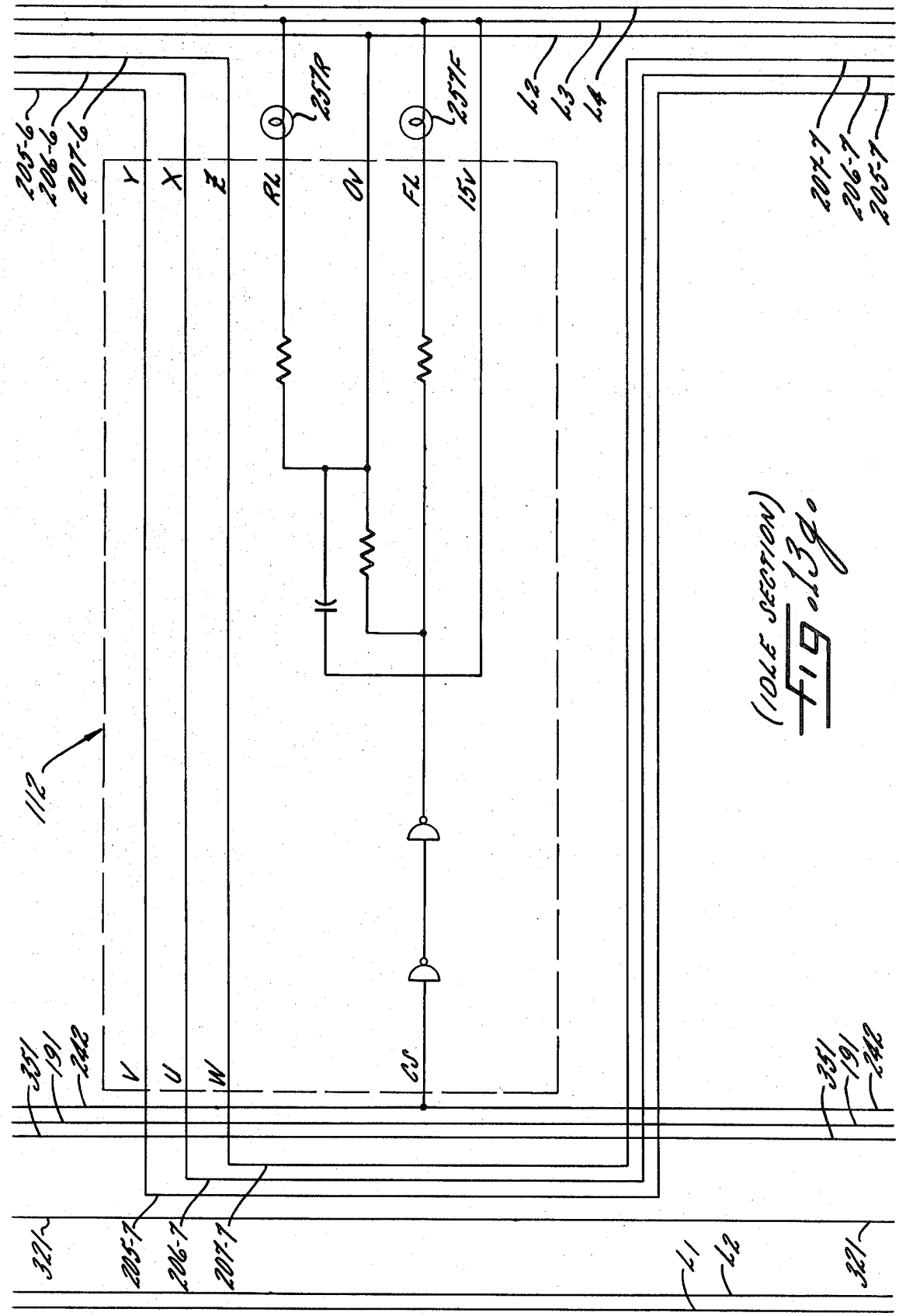
Fig. 13g. (IDLE SECTION)

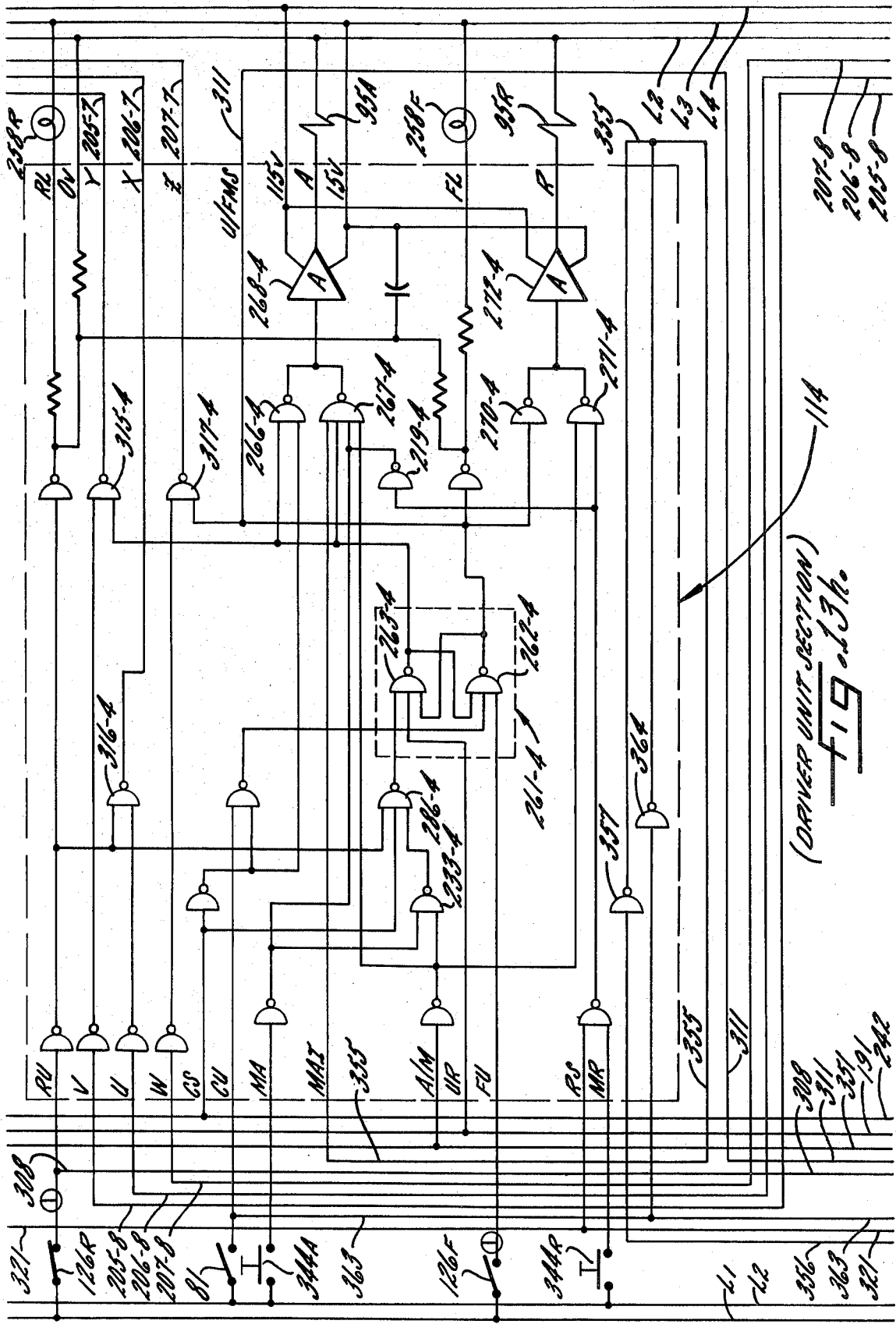

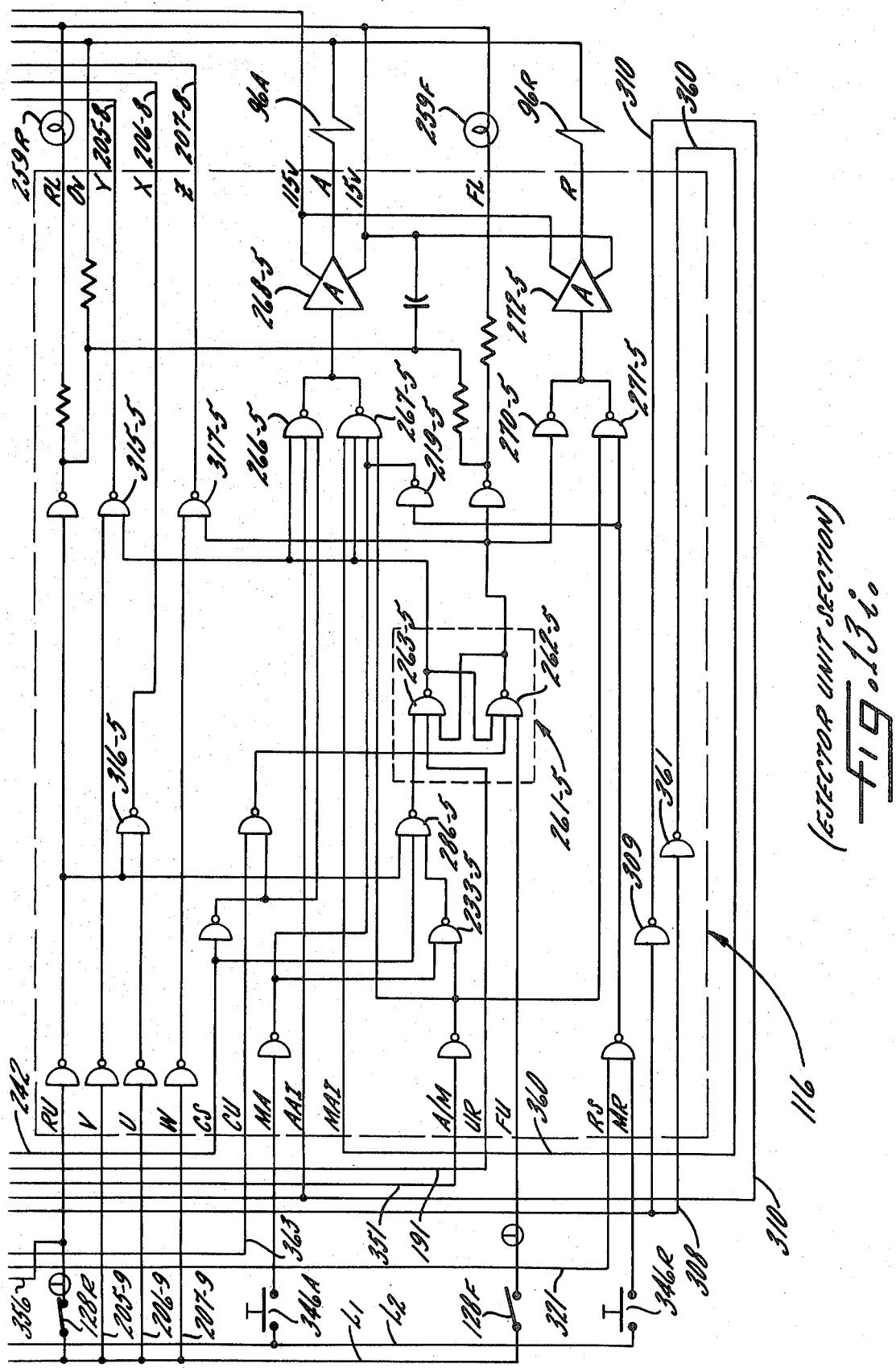

STANDARDIZED CONTROL SECTIONS FOR MACHINE CONTROL SYSTEMS

DESCRIPTION OF THE INVENTION

This invention relates to machine controls and more particularly to machine controls composed of a set of standardized control sections and used for controlling a variety of machine types having motion producing components and automatic cycles of operation.

When faced with the problem of providing a completely automated control assembly for a machine system, a control engineer conventionally designs a single circuit that will control the motions of all the machine components. This circuit must not only control each of the machine motions, it must also insure that the machine motions occur in a predetermined sequence and that each machine motion occurs only if prescribed interlock conditions prevail. One of the difficulties with this conventional approach is that as the machine systems become more complicated because of increasing numbers of machine functions within each machine cycle and because of machine functions which are themselves increasingly complex, the machine control circuit itself becomes more and more complex and unwieldy, both physically as the number of components increase and operationally as increased demands are made on the circuit's capabilities. These circumstances have placed a substantial burden on the engineer since he must develop involved control systems using individual circuit elements which are compact and economical to manufacture and maintain and yet capable of directing the complex machine systems.

As described in U.S. Pat. No. 3,137,212 for "Machine Control Systems," it was earlier recognized that almost all machine systems could be broken down into individual motion producing elements of several basic types. As described in said patent, the engineer follows a method which involves segregating the different basic motions in a machine cycle into advance and return motions and providing a separate, functionally designated control secion for controlling each basic motion and a director section for automatically initiating each machine cycle.

It has been demonstrated that the original concept of segregating the basic machine motions of a machine cycle and providing a separate, functionally designated control section for controlling each basic machine motion is sound and a substantial improvement over prior systems and design procedures because it is no longer necessary for the control engineer to completely design a new control circuit for each new machine system. Using the prior invention, he has only to determine the types and numbers of motion producing elements in the machine system and interconnect the proper standardized control sections to obtain a complete control system which is capable of directing the operation of the machine system such that all machine functions are performed in proper sequence and only when prescribed interlock conditions are present. Additionally, because the earlier control system comprises standardized circuits mounted on removable frames, the control assembly is compact and economical to manufacture and maintain as compared with the conventional control equipment.

However, even utilizing the method described in said patent, as the number of machine motions in each machine cycle increases and the sequence of motions becomes increasingly intertwined and interrelated, the task of interconnecting the control sections of the earlier invention to form a complete control system can become fairly burdensome. Additionally, the wiring between control sections and the numerous control sections required to control a machine having a large number of machine motions result in a machine control system according to the prior disclosure which can be rather complex, expensive and space consuming.

In addition, since the invention of the earlier "Machine Control Systems," more sophisticated machine systems which perform larger numbers of functions have come into more widespread use. These machine systems require controls having an equal sophistication to insure that each operation of the machine is performed in its proper sequence with the proper timing and only after all the necessary interlock conditions have been fulfilled. Further, any standardized machine control for controlling the operation of such machine systems requires a high degree of flexibility in order to be adaptable to control the increased variety and complexity of machine functions.

Therefore, one of the objects of this invention is to provide a set of standardized control sections, each of which embodies a multiplicity of circuits for controlling machine functions, for use in devising and assembling controls for a large variety of complex machine systems which have large numbers of motion producing components and interrelated automatic cycles of operation. A related object is to provide standardized control sections which are highly diversified in their capability to control machine functions and which will accommodate variations of machine operations and provide for special control funcions to insure that all machine operations are performed in their proper sequence and after completion of all required interlock conditions.

An additional object is to provide a method of controlling machine systems having motion producing components operable to perform work functions using a set of standardized control sections of the above type, wherein a machine cycle is automatically initiated only if the motion producing components have successfully performed their work functions in the prior cycle.

A further object is to provide a set of standardized control sections which are easily interconnected with little or no circuit design to control a large variety of complex and simple machine systems.

Another object is to provide a set of standardized control sections which are assemblable into compact, self-contained control systems of the above type and which require a minimum of wiring for interconnection to form the control systems. A yet further object is to provide a set of standardized control sections which have a multiplicity of circuits in the form of printed circuits and integrated circuit components having plug-in sections which facilitate manufacture of a control system and replacement or substitution of individual sections for versatility and ease of maintenance.

Further objects will appear from the following description taken in connection with the accompanying drawings, wherein:

FIG. 12 is a schematic diagram of a DC amplifier circuit used in the standard index circuit of FIG. 6 to provide the power to operate a workpiece support; and FIGS. 13a–13i connected in vertical edge to edge relation to illustrate a schematic wiring diagram showing each circuit of the machine control system shown in block diagram in FIG. 4.

Figure 1:
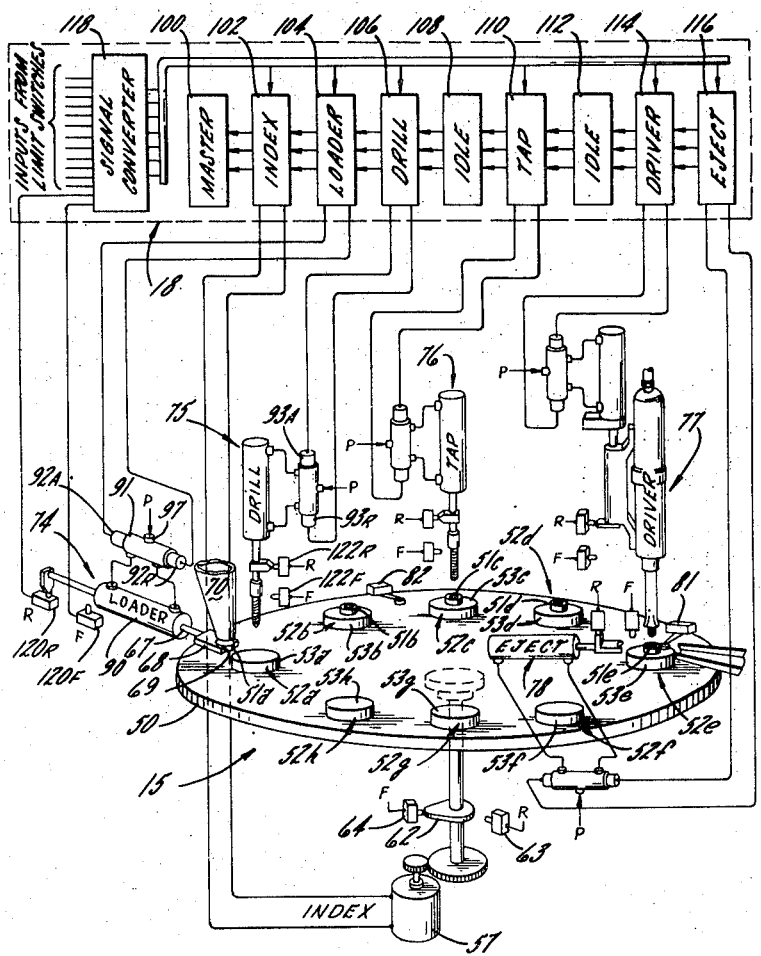
FIG. 1 is a perspective view of a control assembly enclosure.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

I. General Considerations

Almost all manufacturing companies have automated their production lines to the largest extent possible, with some companies automating entire factories. Each automated production line or machine system, whether it consists of only a few machines performing basic machine functions or a completely automated factory of many machines performing a large number of complex and interrelated machine functions, requires for successful operation machine controls that insure each machine function is performed at the proper time, in the proper sequence and only if the required interlock conditions are present.

As explained above, the method according to the prior invention of segregating a machine system into individual motion producing components, providing standardized circuits to control each motion producing component and interconnecting the standardized circuits to form a control system offers a manner of devising control systems for large numbers of machine systems which substantially eliminates the need to completely design a new control circuit for each system. According to the present invention, an improvement in the prior method is followed using standardized control sections and means for interconnection such that the capability is afforded of devising control systems for the full spectrum of machine systems, ranging from elemental machine systems with a few machines performing basic functions to machine systems with many varied machines performing a multitude of interrelated complex machine functions. Additionally, even when devised for complex machine systems, control systems constructed in keeping with the invention will be compact, economical to manufacture, and reliable.

This invention achieves these results by providing a set of standardized control sections in the form of circuit cards which are interconnected to form the machine control systems. There are three basic standardized section circuit cards: a standard master circuit card 20 (FIG. 4) which detects the successful completion of a machine cycle and initiates another cycle, a standard index circuit card 21 (FIG. 5) which controls a movable workpiece support, and a standard unit circuit card 22 (FIG. 6) which controls a machine component in the performance of its work function. In addition the set includes a number of other standard section circuit cards which may be used in addition to or in place of the three basic control section cards to control particular work functions, such as a standard unit-manual circuit card 27 (FIG. 9) which provides for manual operations during a machine cycle and a standard signal converter card having a plurality of independently operable signal converter circuits such as the standard signal converter circuit 26 (FIG. 8) which changes signals from the machine system to signals suitable for use in the control sections of the control system, and to perform other less commonly required tasks, such as a standard shift register circuit card 25 (FIG. 7) which counts and locates rejected workpieces on the production line, and a standard idle circuit card 28 (FIG. 10) which is used in conjunction with a work station at which no work function is to be performed. The terms "standard circuit" or "standard section," as used herein, means a pre-engineered and pre-wired circuit or section.

One of the features of this invention is the use of integrated circuits on printed circuit cards for the set of standardized circuit cards. Such circuit cards are interchangeable with similar and dissimilar standard circuit cards and interconnectable with such other standard circuit cards in a variety of ways according to the teachings of the present invention to form an unlimited number of unique machine control systems, each such system having the capability of controlling the operation of a specific machine system and being easily alterable by varying the number of or the interconnections between the various standard circuit cards to accommodate changes in or additions to the machine functions. Further, the use of integrated circuits, comprised principally of logical NAND gates, provides great diversity and flexibility and enables the construction and assembly of control systems capable of controlling the most basic and the most complex machine systems.

Figure 3:
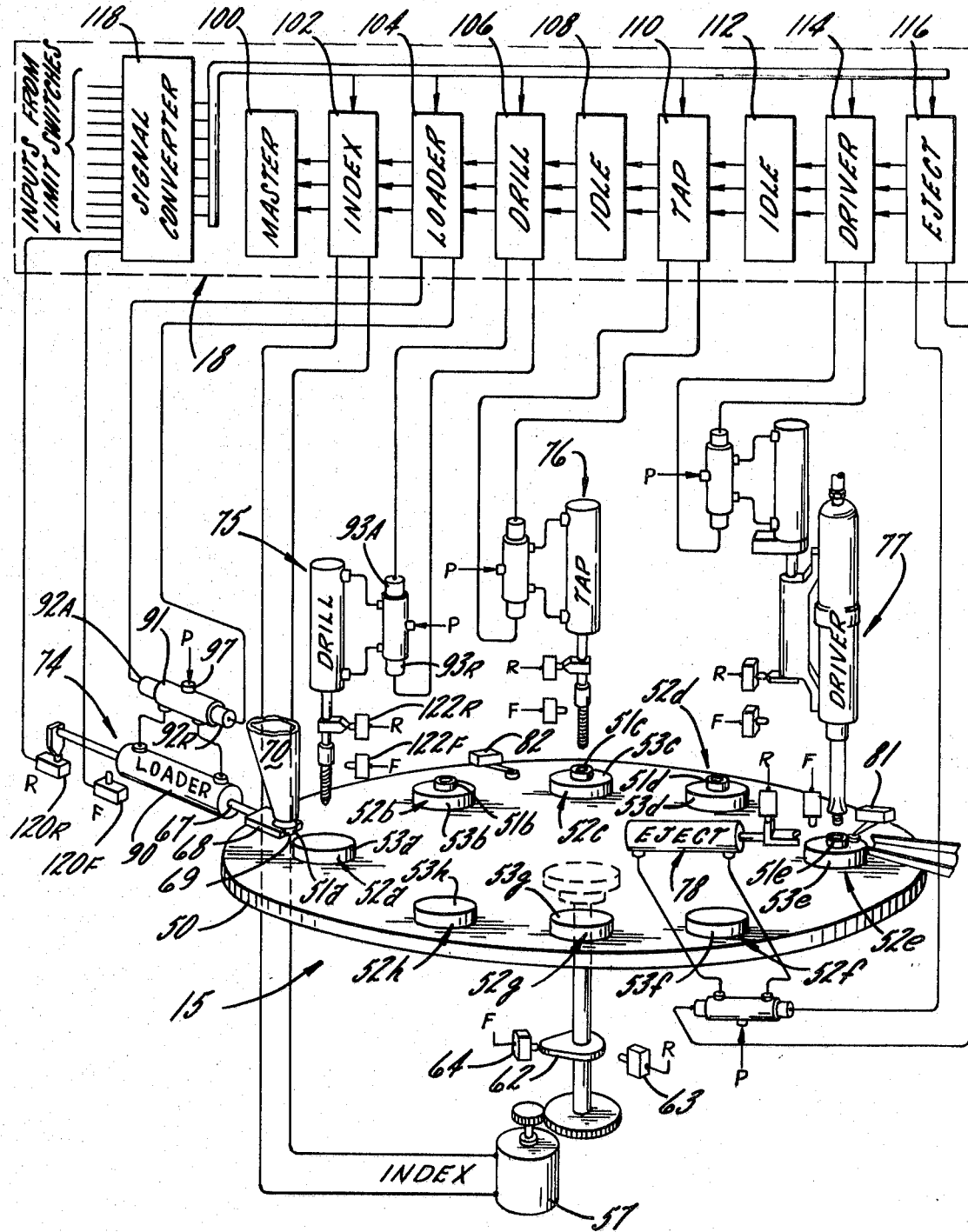
FIG. 3 is a schematic view and block diagram of a combination of a machine system and of a machine control system constructed according to the present invention.

Turning now to the drawings, there is shown in FIG. 3 a schematic view of a machine system 15 and a block diagram of a control system 18 therefor constructed in accordance with the teachings of the present invention. More specifically, there is shown an exemplary machine system for automatically drilling and tapping a hole in workpieces and screwing a small screw into the hole and, in block diagram, an illustrative machine control system including interconnected standardized control sections for controlling the performance of the work functions. It should be realized that this exemplary machine system in many cases would be integrated in a much larger machine system assembly of many small systems, some of which might perform many more machine functions than the exemplary system. Such a larger integrated system would be controlled by a single integrated control system, including with some slight modifications the illustrative machine control system 18. However, in order to particularly describe the invention without becoming entangled in the complexities of the machine system being controlled, the less complex exemplary machine system 15 is disclosed with an embodiment of the invention for controlling its operation.

Before detailing the illustrative control system and its set of standardized control sections, it is helpful to have an understanding of the machine components which are to be controlled and particularly the types of motion producing components that are employed in the exemplary machine system and of the manner of sensing the various motions for interlock and cycling purposes. Briefly, therefore, still referring to FIG. 3, the machine system 15 comprises a table 50 with eight work stations 52a to 52h each having a work holder 53a to 53h for holding the workpieces 51a to 51e while work functions are performed on them. To index the table 50 in order to move the workpieces through the work stations, a drive motor 57 rotates the table by means of electrically controlled clutch 58 and brake 59 mechanisms (FIG. 13b) through a Ferguson or Geneva-motion type gear (not shown) such that the table rotates one-eighth of a full cycle during the first one-third of each cycle of rotation of the drive motor 57 and remains stationary or dwells during the remaining two-thirds of each cycle. Because of the Ferguson or Geneva-motion gear, the clutch 58 is always energized during normal operation of the machine system; the brake 59 is energized and the clutch 58 de-energized to stop the rotation of the table during emergencies when, for example, a machine component has failed to perform its function properly and it is necessary to stop the table during or at the end of a machine cycle to correct the malfunction.

A cam element 62 indicates the commencement and termination of an indexing operation of the table. The cam element strikes a first limit switch 63 just as the Ferguson or Geneva-motion gear causes the table to begin rotating; as a result, an interlock signal is relayed from the limit switch 63 to the control system 18 indicating that the table has begun indexing the workpieces to the next work stations. After the cam element has rotated through 120°, it strikes a second limit switch 64 which indicates that the workpieces have been successfully indexed to their next work stations and a cycle of machine functions can begin. At this point, the Ferguson or Geneva-motion gear releases the table and the table remains motionless during the next 240° of rotation of the drive motor as a cycle of machine or work functions is performed. Of course, the relative periods of rotation and dwell of the table can be varied dependent upon the speed of rotation, the time required to rotate the table between the work stations, and the time required to perform a machine cycle since each machine cycle generally must be accomplished during the period when the table is motionless.

In the exemplary machine system, work functions are performed at three 52a, 52c and 52e of the eight work stations. During each machine cycle a loader arm 68 with a gripper 69 movable by a hydraulically operated ram 67 carries a workpiece 51a from a supply source 70 to a work holder 53a positioned at the first work station 52a. The gripper 69 places the workpiece in a holding means (not shown) on the work holder and continues to hold the workpiece to insure that it does not move while a hydraulically operated drill 75 drills a hole in the middle of it. At the third work station 52c a hydraulically operated tapper 76 taps the hole in the workpiece 51c to thread the hole. At the fifth work station 52e, after the workpiece 51e has been detected by a part-in-position switch 81, a hydraulically operated screwdriver 77 places a screw in the threaded hole of the workpiece and a hydraulically operated ejector 78 ejects the workpiece 51e after the screw has been inserted. The second 52b and fourth 52d work stations are idle stations where no work functions are performed. At the completion of the work cycle, the table 50 is indexed one position and the next work cycle is automatically commenced. As the table is being indexed, a second part-in-position switch 82 determines whether a workpiece is properly situated on its work holder as the workpiece moves from the second to the third work station.

From the foregoing, it will be seen that each of the machine components operates in essentially the same fashion; that is, a power driven member or motion producing component advances to perform a work function and returns to its initial position. The advance and return motions, including linear and rotational movement, are under the direct control of a device herein shown as a solenoid actuated valve. However, many similar control devices such as pneumatic valves or electrical motors can be controlled according to the invention; similarly, the power components for producing the requisite motion may be, for example, hydraulic rams or pneumatic actuators or electrical drives.

Though control systems devised according to the teachings of this invention are not restricted to control only hydraulic devices such as illustrated herein for operation of the loader 74, for purposes of illustration the operation of the hydraulically operated loader will be briefly described. The loader 74 has a gripper 69 which accepts workpieces from a workpiece supply source 70 and individually loads them on a work holder at the first work station 52a. To control the movement of the ram 67 which operates the loader arm 68, hydraulic fluid is supplied to the ram cylinder 90 under the control of a valve 91 which is actuated by two solenoids 92A, 92R that are controlled by the control system 18; these solenoids 92A, 92R determine the position of the valve 91 which, in turn, directs the flow of hydraulic fluid to the cylinder 90 and causes the loader arm 68 to advance or return.

The loader 74 is shown in FIG. 3 after having accepted a workpiece 51a from the supply source 70. At the beginning of the machine cycle, after the table 50 has been indexed under the direction of a standard index section 102, a standard unit section 104 associated with the loader 74 energizes in response to a signal from a standard master section 100 the solenoid 92A to position the valve 91 to direct hydraulic fluid from the valve input 97 to the rear of the cylinder 90 which causes the ram 67 to move forward and advance the loader arm 68 to place the workpiece 51a on the work holder 53a. When the loader arm attains its most forward or advance position, a position detecting device, shown herein as a limit switch 120F, is actuated causing an interlock signal to be carried to a signal converter 65 (FIG. 13c) in the signal converter section 118. The signal converter converts and transmits the signal to the loader standard unit section 104 to energize the valve solenoid 92R controlling the loader to return the loader arm at the proper time and through the loader section 104 to a drill standard unit section 106 to energize the solenoids 93A, 93R controlling the drill 75 to advance the drill and drill a hole in the workpiece 51a on the work holder 53a and to return the drill to its initial position. When the drill reaches its forward position during its drilling operation, it trips a limit switch 122F which signals through another signal converter the drill standard unit section 106. However, the drill does not immediately return to its initial position, but rather is delayed for a predetermined period at its forward position and continues to drill to insure that a clean hole is drilled completely through the workpiece before returning to its initial position. After the drill has completed its operation and has returned striking a limit switch 122R, there is transmitted an interlock signal to the loader standard unit section 104 which shifts the loader valve 91 to direct hydraulic fluid to the front end of the cylinder 90, thereby returning the loader arm 67 to its initial workpiece receiving position aligned below the workpiece supply source 70. When the loader arm has returned to its initial position, it trips a second limit switch 120R causing another interlock signal to be carried to another signal converter which transmits the signal to the loader standard unit circuit indicating that the loader arm has returned to its return position, has completed its cycle of operation, and is ready to begin the next machine cycle.

In basically the same way a standard unit section 110 controls the advance solenoid 94A and the return solenoid 94R to advance and return the tapper 76 in response to signals from the master section and interlock signals resulting from the forward 124F and return 124R limit switches and the part-in-position switch 82. Likewise, the driver standard unit section 114 and the ejector standard unit section 116 are operative to control their respective advance solenoids 95A, 96A and return solenoids 95R, 96R in response to signals from the master section and interlock signals resulting from the limit switches 126F, 126R, 128F and 128R and the part-in-position switch 81.

II. Standardized Control Sections

Now turning to the standardized control sections, the following paragraphs A-G briefly describe the functions served by the various disclosed circuits of the control sections with a detailed description of most of these circuits subsequently given in paragraph III C.

A. Standard Master Section

The standard master section is operative to commence a new machine cycle in response to signals from other control sections indicating that the previous machine cycle has been successfully completed. The standard master section also generates a signal which is transmitted to the other control sections to set the control system for manual or automatic operation and, preferably, provides a reset capability whereby all the motion producing components in the machine system can be returned to their start positions if there is a malfunction in the operation of the machine system or the control system.

Figure 4:
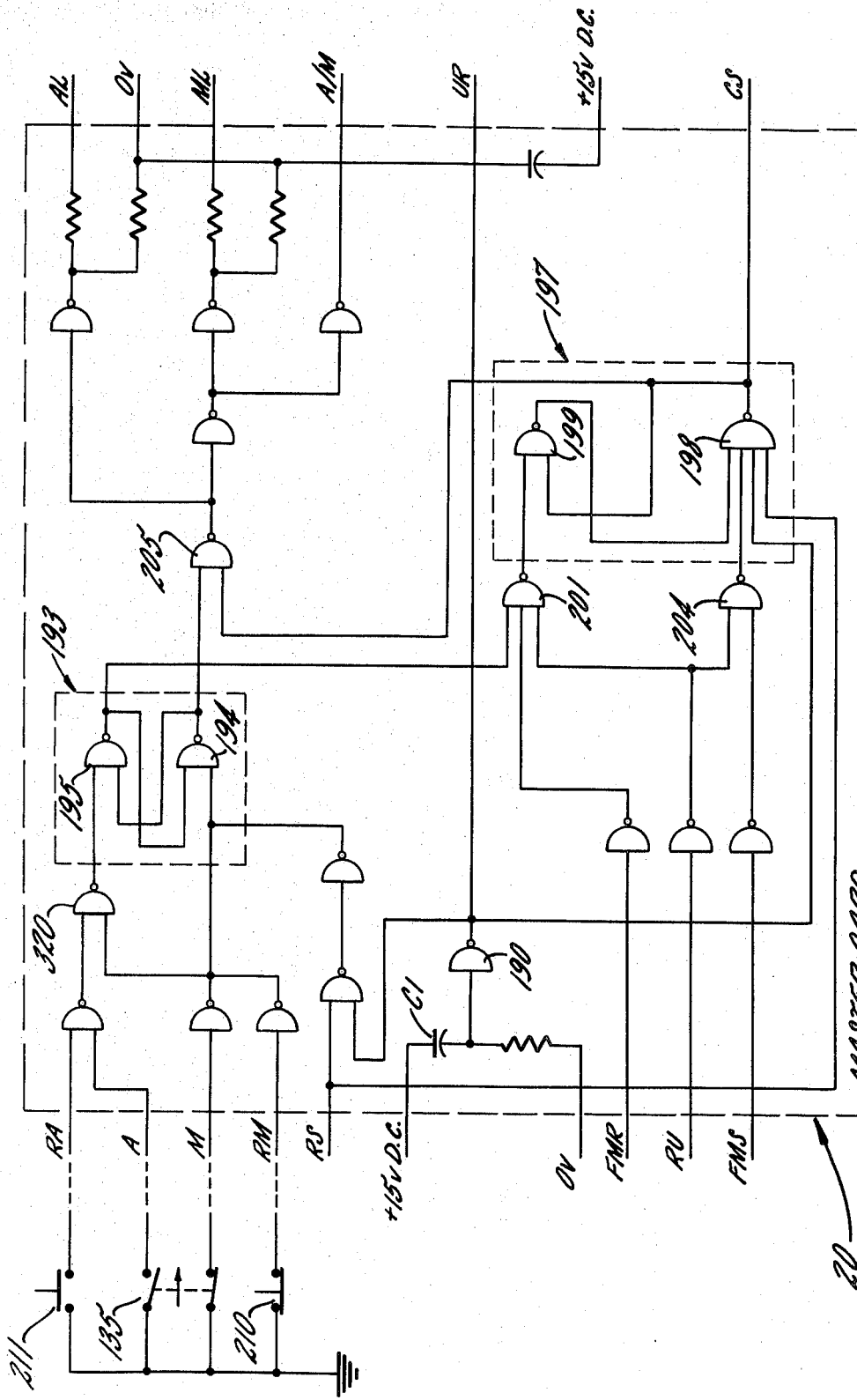
FIG. 4 is a schematic diagram of a standard master circuit constructed according to the present invention.

The standard master circuit 20, an example of which is shown in FIG. 4, primarily comprises, in its preferred embodiment, NAND logic gates, preferably in the form of integrated circuit elements mounted on a printed circuit board. Since NAND gates are commonly utilized as logical gate elements in electronic arts, the details thereof are not set forth herein; however, a brief description of some of their pertinent characteristics will be of assistance in understanding the operation of the illustrative control system. A NAND gate can have one or a plurality of input terminals, but only a single output terminal; it is constructed such that the output signal is a logic one — 1 — whenever any one of the input signals is a logic zero — 0 — and is 0 whenever all the input signals are 1. When the outputs of several NAND gates are connected together, the connecting point acts as a 0 OR gate, that is, if any one of the outputs is 0, the connecting point is 0. It should be realized, however, that it is not necessary to use NAND gates as the primary circuit elements of any of the standard circuits. There are a large variety of other circuit elements, including sundry logic elements and discrete components, known to those skilled in the art which could be used in the standard circuits of the present invention.

Associated with the preferred standard master circuit as part of the standard master section is an auto-manual switch 135 (FIG. 13a) which controls the mode of operation of a control system; an "auto-manual" (A/M) signal is transmitted to the other standard control sections to set them for the chosen mode of operation. A manually operated reset button 136 provides a means to stop the machine system and return the motion producing components to their start positions if, for instance, there is a malfunction during a machine cycle. A "cycle start" (CS) signal which initiates a machine cycle in the automatic mode of operation is generated in response to the auto-manual switch 135 being in the automatic position and to the "positive sequence interlock" signals, that is, the "all units returned" (RU) signal, the "forward memory set" (FMS) signal, and the "forward memory reset" (FMR) signal, which are generated in a feedback loop running through all the standard unit circuits and the standard index circuits, indicating that the previous machine cycle has been successfully completed.

B. Standard Index Section

For moving the workpiece from work station to work station, machine systems typically include at least one workpiece support, such as table 50. The standard index section directs the operation of such a workpiece support and its drive means to index the workpieces at the proper time in each work cycle in the presence of predetermined interlock conditions, and generates and relays to the standard master section through the feedback loop a set of positive sequence interlock signals which indicates when a machine cycle has been successfully completed. If in a particular machine system there is more than one workpiece support, it is then necessary to provide a standard index section for each of these supports.

Figure 5:
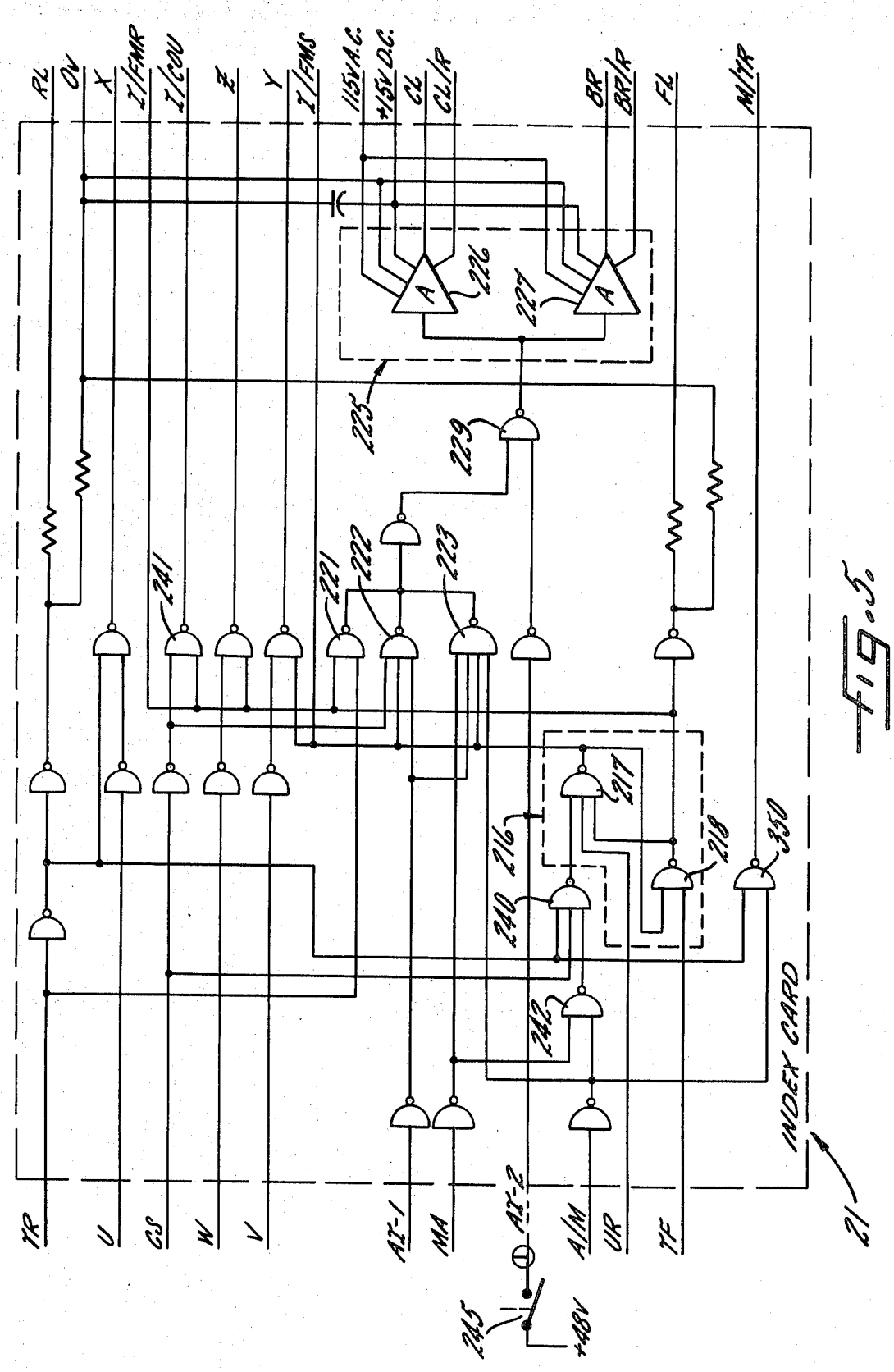
FIG. 5 is a schematic diagram of a standard index circuit constructed according to the present invention.

In FIG. 5 there is illustrated a standard index circuit 21 particularly suited for directing the movement of the table 50 of the exemplary machine system 15. In the automatic mode of operation in response to the CS signal from a standard master circuit, the standard index circuit continually energizes the clutch 58 to drive the table and maintains the brake 59 in a de-energized state. In the manual mode of operation the standard index circuit energizes the clutch and de-energizes the brake to rotate the table only when an index advance switch 337 (FIG. 13b) is closed. The return limit switch 63 and the forward limit switch 64 detect the progress of the drive motor 57 in indexing the table 50 each machine cycle. To generate the RU signal, the FMS signal, and the FMR signal, the standard index circuit combines in accordance with the invention, as will be explained in greater detail below, a set of feedback or positive sequence interlock signals from the standard unit sections with a set of interlock signals indicative of the progress of the indexing operation. The standard index circuit also produces an "index cycle other units" (I/COU) signal in the automatic mode of operation and a "manual/table returned" (M/TR) signal in the manual mode to indicate to the standard unit sections that the workpiece support has been successfully indexed and that the motion producing components can therefore be energized to perform the prescribed work functions.

C. Standard Unit Section

A standard unit section is provided in the set of standardized control sections for each motion producing component in a machine system. Each standard unit section controls the operation of its respective motion producing component to insure that the component performs its work function at the proper time in the sequence of operations performed by the machine system each machine cycle if predetermined interlock conditions are present. In addition, each respective standard unit section in a feedback circuit generates and advances through the feedback loop a set of positive sequence interlock signals indicating the conditions of its respective motion producing components and of the motion producing components corresponding to the prior standard unit sections connected in the feedback loop. This set of positive sequence interlock signals is operated upon by each succeeding standard unit section and standard index section to include information in the set of signals indicative of the condition of all the motion producing components and all the workpiece supports; the last standard control section in the feedback loop, which is usually a standard index section, transmits its set of positive sequence interlock signals to the standard master circuit as the RU signal, the FMS signal and the FMR signal.

Figure 6:
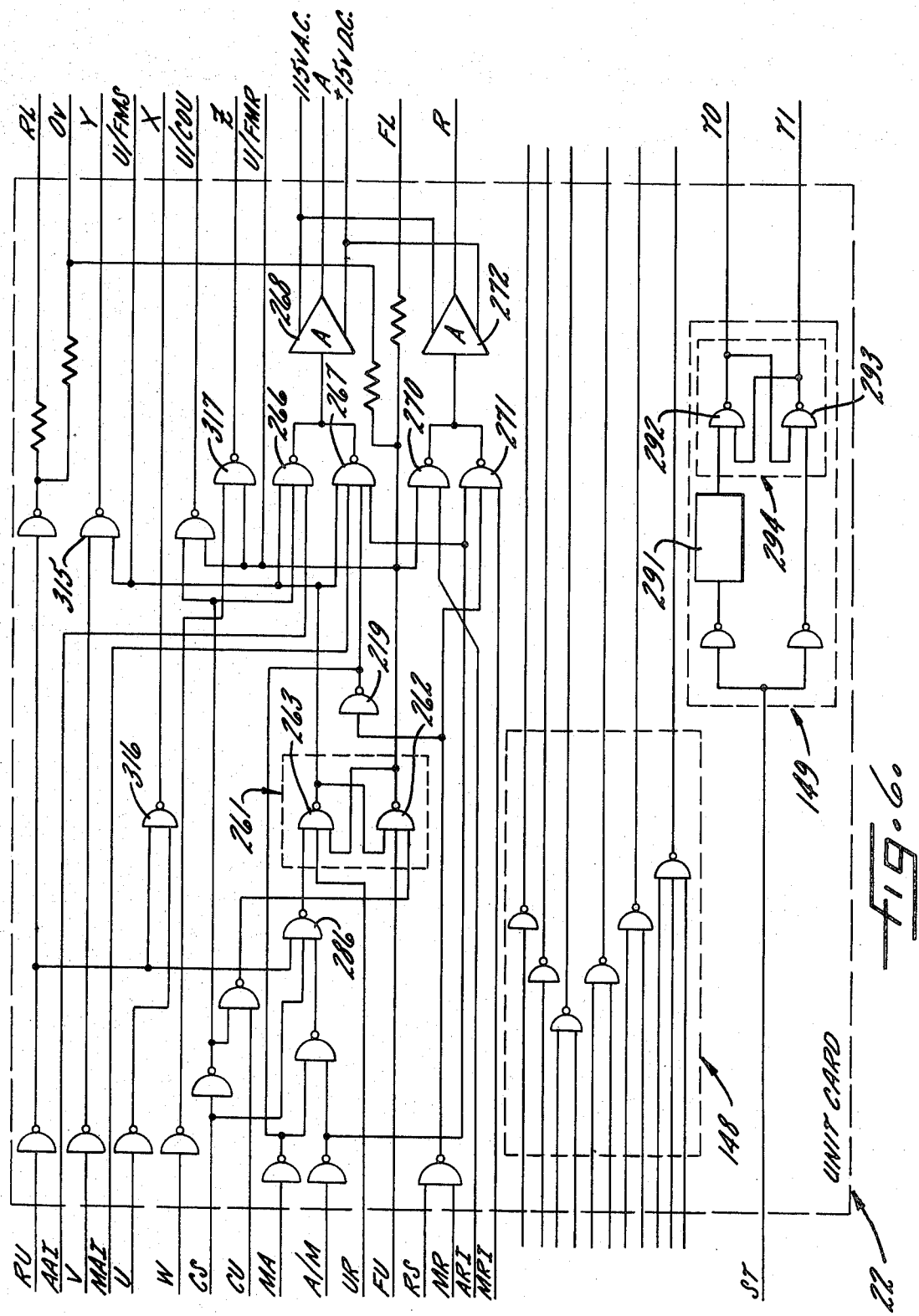
FIG. 6 is a schematic diagram of a standard unit circuit constructed according to the present invention.
Figure 7:
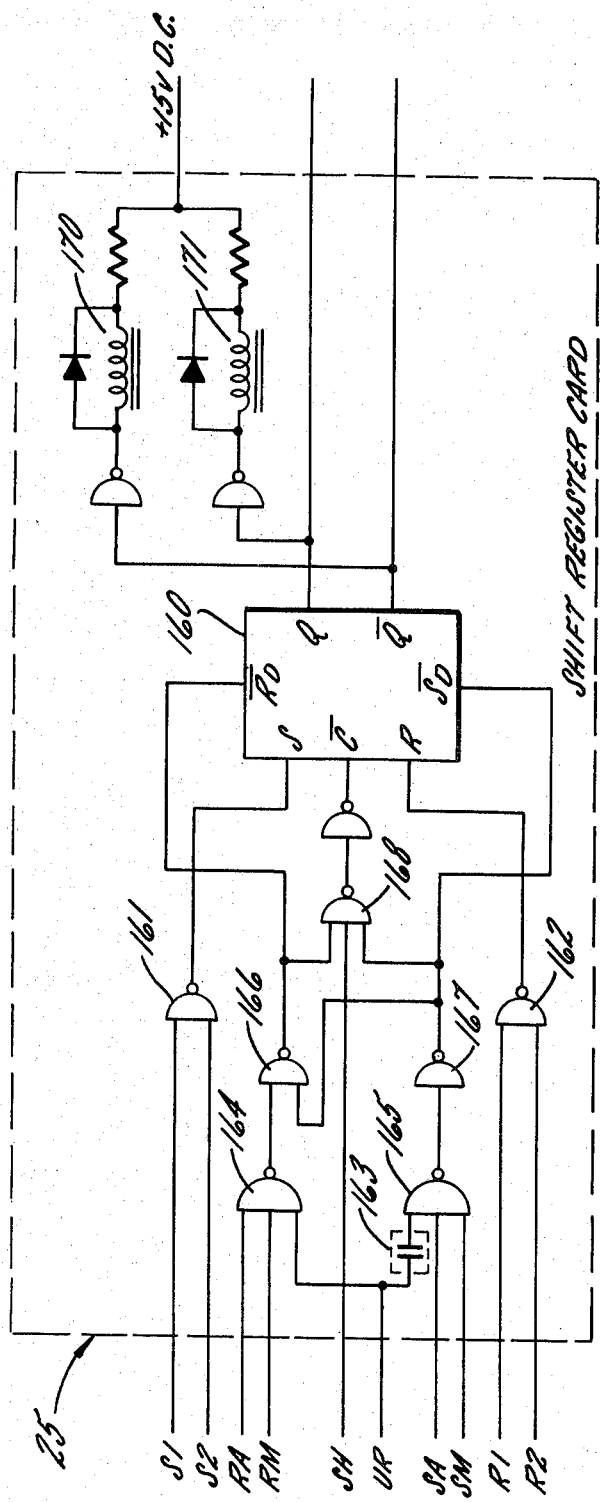
FIG. 7 is a schematic diagram of a standard shift register circuit constructed according to the present invention.

The standard unit circuit 22 illustrated in FIG. 6 has been devised according to the invention to perform these necessary functions and to provide other capabilities to meet the control requirements of various machine systems. In the automatic mode of operation, the standard unit section through a control circuit energizes an advance solenoid such as solenoid 92A (FIG. 13c) which directs the loader 74, and then a return solenoid, such as 92R, to advance and return its corresponding motion producing component at predetermined times in each machine cycle in the presence of predetermined interlock conditions and in response to a CS signal from the standard master circuit or a I/COU signal from a standard index circuit and to a set of selected interlock signals from itself and from other standard unit or control sections. In the manual mode of operation, the standard unit section energizes the advance solenoid only if a unit advance switch, such as 338A, is operated and the predetermined interlock conditions prevail and similarly the return solenoid only if a unit return switch, such as 338R, is operated and the proper interlock conditions exist. Each standard unit section has a forward limit switch, such as switch 120F, and a return limit switch, such as switch 120R, that determine whether the corresponding motion producing component is in its forward or return position and provide interlock signals indicative thereof.

In keeping with the invention, the standard unit section additionally includes auxiliary circuitry 148 comprised of a plurality of electrically isolated circuit elements, that are NAND gates in the present embodiment. The number and types of circuit elements used in the auxiliary circuitry can vary and some standard unit sections will not need auxiliary circuitry; nevertheless, it has been found that if, in a NAND gate control, each standard unit section has auxiliary circuitry comprising two single-input NAND gates, three double-input NAND gates, and a triple-input NAND gate, the set of standardized control sections will have the capacity and the flexibility to be interconnected to form machine control systems that are able to direct the operation of a great variety of machine systems. The auxiliary circuitry has significant utility in connecting the interlock signals to the standard unit circuits to insure that the motion producing components are operative in the predetermined sequence and only in accordance with the prescribed interlock conditions. It will be realized that it is possible to provide auxiliary circuitry of various types on any of the sections of the set of standardized control sections.

There can also be provided on the standard unit section a time delay circuit 149. This time delay circuit can be omitted in particular control systems; however, the circuit provides increased capacity and flexibility, for example, where it is required to provide a delay or pause between sequential machine functions or where it is necessary to continue a machine function for a short period after the motion producing component has been extended to its forward limit position before returning the component to its returned position.

D. Standard Signal Converter

Figure 8:
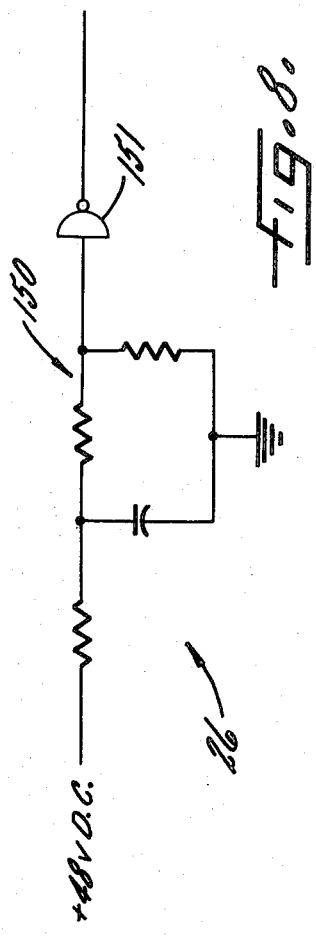
FIG. 8 is a schematic diagram of a standard signal converter circuit constructed according to the present invention.

The standard signal converter circuit, an example 26 of which is shown in FIG. 8, adapts the interlock signals from interlock signal means, which can be the limit switches indicating the positions of the workpiece supports, the motion producing components, and the workpieces themselves, to be compatible with the standard index and the standard unit circuits. The limit switches are commonly connected to a power source having a relatively high voltage level, herein shown as +48 V.D.C.; the signal converter employed in the illustrative machine control system decreases the voltage level in a voltage divider 150 and inverts it in a NAND gate 151 to make it compatible with the requirements of the NAND logic control circuits. A plurality of these signal converters can be placed on a single standard printed circuit card and interconnected with the control sections of a machine control, like signal converter 65 (FIG. 13c) and the other signal converters shown in the wiring diagram of control 18.

This standard signal converter circuit can be changed depending upon the type of power source being used to power the control system and the requirements of the control system; for instance, if an A.C. power source were being used, it would be necessary to provide a standard signal converter circuit which included a rectifier means. It is also possible to provide a set of standardized control sections which do not require any standard signal converter circuits to adapt the interlock signals from the interlock signal means for application to the control circuits.

E. Standard Unit-Manual Section

Figure 9:
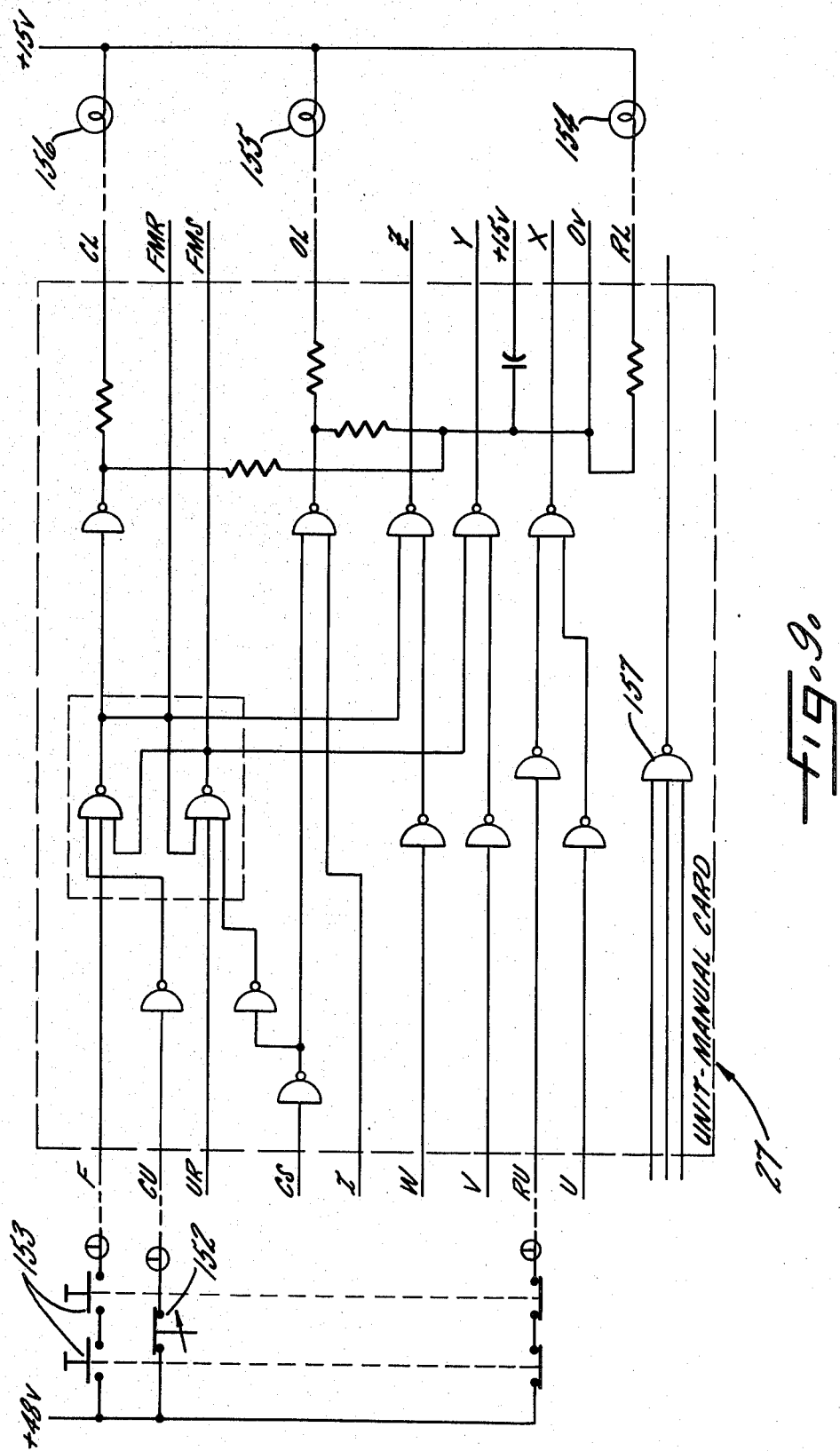
FIG. 9 is a schematic diagram of a standard unit-manual circuit constructed according to the present invention.

The standard unit-manual circuit 27 of FIG. 9 provides the capability of performing manual operations on a workpiece at a respective work station during a machine cycle. When the unit-manual section has been activated by depressing an on-off switch 152 to the position shown, an "operator" light 155 is illuminated in response to a CS signal to notify the worker that a new cycle has begun and he can perform his manual operation. When the worker has completed his operation, he simultaneously depresses the "unit cycled" switches 153 to generate a set of positive sequence interlcok signals in the feedback loop and to illuminate a "cycled" light 156. There can also be provided auxiliary circuitry such as a NAND gate 157, the output of which can be connected to the interlock (I) input terminal to control the "operator" light by means of interlock signals from other control sections if, for instance, it is necessary to perform a machine function on the workpiece before the worker performs his manual operation. The standard unit-manual section further includes circuitry which is connected into the feedback loop and which generates feedback signals indicating that the manual operation has been completed and circuitry for illuminating light 154 whenever power is applied to the control.

F. Standard Idle Section

Figure 10:
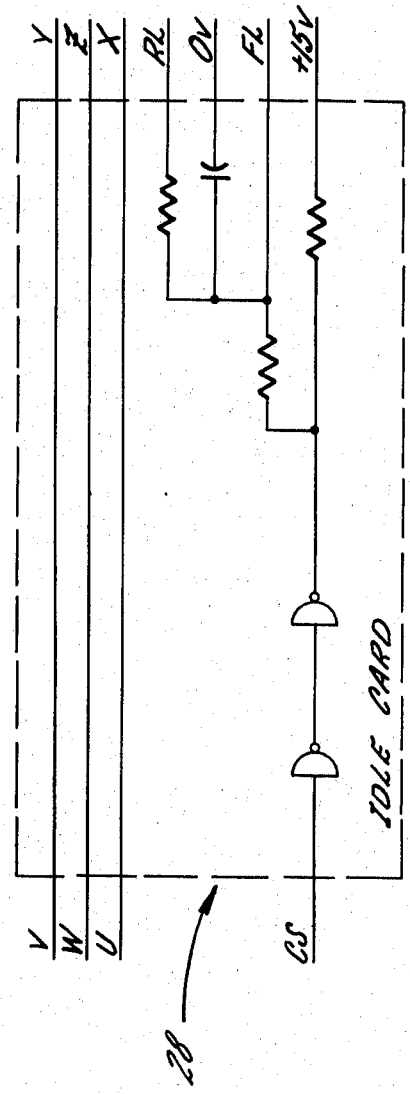
FIG. 10 is a schematic diagram of a standard idle circuit constructed according to the present invention.

The standard idle circuit 28 of FIG. 10 is generally used in conjunction with a work station at which no machine function or manual operation is presently being performed. The standard idle circuit simply provides three printed circuit lines which are connected into the feedback loop to relay the positive sequence interlock signals from the previous standard control section to the subsequent standard control section and a circuit to control the lights associated with the standard idle section's work station.

The advantage of providing a standard idle section resides in the flexibility obtained since it is only necessary to replace the standard idle section in the control system with a standard unit section if it is desired to perform a work function at the idle work station. Thus, the machine system can be changed by adding a work function and it is not necessary to construct an entirely new control system; the opposite is also true since a work function can be eliminated by merely replacing its standard unit section with a standard idle section.

G. Standard Shift Register Section

The standard shift register circuit 25 (FIG. 7) is generally used in a control system to monitor the movement of special or defective workpieces as they are indexed from work station to work station and to sort out these special defective workpieces at predetermined points along the work line. In addition, the present standard shift register can be used for all memory and control functions commonly performed by shift registers.

A shift register system, for use with a control system, will include a shift register circuit 25 associated with each work station; these circuits can be mounted on printed circuit boards and serially interconnected for the shifting of informaion from one circuit to the next. The embodiment of the invention shown in FIG. 7 comprises a master-slave RS flip-flop 160 of a type known to one of ordinary skill in the art, a latching relay having a relay contact 163, an unlatching coil 170, and a latching coil 171, and a plurality of NAND gates, all interconnected by the printed circuit.

When interconnected in a shift register system, the shift register circuit receives input information signals from the output terminals Q and $\bar{Q}$ of the prior circuit in the shift register system on inputs S1 and R1, respectively. This input information takes the form of positive and negative pulse signals indicative of the state of the workpiece being indexed to the associated work station. For example, to indicate that the workpiece being indexed to the associated work station is a defective workpiece, which is the first of two possible states of the workpiece, the input information signal to the input 1 might be a 1 pulse and the input information signal to the input R1 would then be a 0 pulse which is the first state of the input information signals; whereas, to indicate that the workpiece is a good or non-defective workpiece, which is the second possible state of the workpiece, the signal to S1 would be a 0 pulse and the signal to R1 a 1 pulse which is the second state of the input information signals. It should be noted that S1 and R1 will always have opposite input information signals.

Assuming for the moment that a workpiece is defective such that the S1 information signal is a 1 pulse and the R1 information signal is a 0 pulse, thes two signals are inverted in gates 161 and 162 respectively and fed to their respective S and R input terminals of the master-slave flip-flop. However, the flip-flop does not immediately shift this information to the Q and $\bar{Q}$ output terminals, rather the flip-flop waits until it receives a 0 clock ($\bar{C}$) input pulse signal from the "shift" (SH) input terminal indicating the occurrence of a predetermined clocking event to initiate a second inversion and shifting of the S1 and R1 information signals to the Q output terminal as a 1 pulse and $\bar{Q}$ output terminal as a 0 pulse respectively, to indicate that the workpiece being indexed from the associated work station is defective. In a machine system this predetermined clocking event is typically the end of a machine cycle such that as, for instance, the table 50 of the exemplary machine system 15 is being indexed for positioning the workpieces to their next work stations, the information signals of each shift register circuit are shifted to the Q and $\bar{Q}$ output terminals and thus to the S1 and R1 input terminals of the subsequent shift register circuit in the shift register system. If the workpiece is non-defective, the shift register circuit operates in the same manner to transfer the set and reset information signals indicating this fact to the output terminals of the shift register circuit.

The S2 and R2 input terminals are provided to give greater flexibility to the shift register circuit since in some cases it might be desirable to shift signals from one of two possible information signal sources. This can be accomplished by connecting one source, such as the prior shift register circuit, to the S1 and R1 inputs and the second source to the S2 and R2 inputs and provide a means to choose which signals will be shifted by the master-slave flip-flop.

The shift register circuit 25 additionally includes the capability of overriding the S1 and R1 input information signals upon an independent determination that, for example, a workpiece is defective or non-defective. This capability is provided internally of the shift register circuit by a "direct reset" ($\bar{R}_D$) and a "direct set" ($\bar{S}_D$) input to the master-slave flip-flop and their respective governing circuits. Further, typically associated with each work station and thus with each shift register circuit is a means, which could be test equipment or merely an operator making a visual check, to determine whether the workpiece at the associated station is defective or non-defective after the work functions at that station had been completed. For use in the shift register circuit, the means for determining the state of the workpiece provides a 0 pulse to the "automatic reset" (RA) input terminal in the automatic mode or to the "manual reset" (RM) input terminal in the manual mode to indicate that the workpiece is good or non-defective or a 0 pulse to the "automatic set" (SA) input terminal or to the "manual set" (SM) input terminal to indicate that the workpiece is defective.

If a non-defective workpiece is indexed to a work station for the performance of a work function, a 0 pulse is applied to input S1 and a 1 pulse to input R1 for transfer to output terminals Q and $\bar{Q}$ respectively at the end of the work function. However, if the work function is improperly performed and the workpiece thus becomes defective, it is necessary to provide information signals to the output terminals indicating a defective workpiece rather than to transfer to the output terminals the set and reset information signals which indicate a non-defective workpiece. To accomplish this, a 0 pulse is applied to either the SA or the SM input terminal depending upon the mode of operation; this 0 pulse is applied through the set governing circuit which includes NAND gates 165 and 167 to the $\bar{S}_D$ input of the master-slave flip-flop and additionally through the clock circuit to the $\bar{C}$ input of the flip-flop as a clock signal to activate the flip-flop to generate in response to the $\bar{S}_D$ 0 pulse a 0 pulse on the $\bar{Q}$ output terminal and a 1 pulse on the Q output terminal. Thus, the information signals on the output terminals Q and $\bar{Q}$, which are transmitted to the subsequent shift register circuit in the shift register system, correctly indicate a defective workpiece even though the set and reset input information signals indicate that the workpiece is non-defective. The master-slave flip-flop will also override the set and reset information signals indicating a defective workpiece if a 0 pulse is received through the reset governing circuit including NAND gates 164 and 166 at the $\bar{R}_D$ terminal indicating that the defect has been corrected or is insignificant; in this case the flip-flop is operable in response to the 0 pulse $\bar{R}_D$ information signal to generate a 0 pulse at Q and a 1 pulse at $\bar{Q}$ to indicate that the workpiece is non-defective. Thus the two governing circuits can control the operation of the master-slave flip-flop to introduce new information signals indicative of the state of the workpiece into the shift register circuit.

The shift register circuit 25 also has a retentive memory means which stores the state of the output information signals on the terminals Q and $\bar{Q}$ when power is removed from the shift register circuit; when power is subsequently re-applied, the retentive memory means activates the master-slave flip-flop to generate output information signals indicative of the state when the power was removed. With a defective workpiece at the associated work station, the flip-flop generates a 1 pulse at Q and a 0 pulse at $\bar{Q}$; the 1 pulse, after inversion in a NAND gate, activates latching coil 171 which is operative to latch closed relay contact 163 in the set governing circuit. The latching coil 171 will maintain the relay contact closed until the latching coil 170 is activated to latch the contact open even when power is removed from the shift register circuit. When power is subsequently re-applied to the circuit, a 0 pulse, which can be the "universal reset" (UR) pulse generated by the standard master section, as will be described in detail subsequently, when the standard shift register circuit is used as part of the set of standardized control sections, is applied to the UR input terminal. This 0 pulse is operable to enable both of the governing circuits to control the flip-flop simultaneously. However, the 0 pulse, after passage through the closed relay contact 163 and double inversion by gates 165 and 167, is connected to an input of gate 166 in the reset governing circuit to prevent that gate from generating a $\bar{R}_D$ 0 pulse. Thus only a 0 $\bar{S}_D$ pulse is applied to the flip-flop to control the flip-flop to provide 1 Q information signal and a 0 $\bar{Q}$ information signal indicative of a defective workpiece; this was the same state of the output information signals when power was removed from the shift register circuit. On the other hand, with a non-defective workpiece at the associated work station, the master-slave flip-flop generates a 0 pulse at Q and a 1 pulse at $\bar{Q}$. The 1 pulse is operable to activate latching coil 170 to latch open the relay contact 163 until latching coil 171 is activated to close it. When power is removed from the shift register circuit with the relay contact opened and then re-applied, the 0 UR pulse is unable to affect the set governing circuit because of the open circuit caused by open relay contact. However, the 0 UR pulse is operable to provide through the reset governing circuit a 0 $\bar{R}_D$ pulse which controls the flip-flop to provide a 0 Q output information signal and a 1 $\bar{Q}$ output information signal indicative of a non-defective workpiece; again this way the same state of the output information signals when power was removed from the shift register circuit.

As noted previously, though the present shift register circuit has been explained in conjunction with a control system to locate defective workpieces, this shift register circuit has much wider use and could be used within the scope of the present invention to perform all control and memory functions commonly performed by shift register circuits.

III. Illustrative Control System

A. Control System Organization

Figure 2:
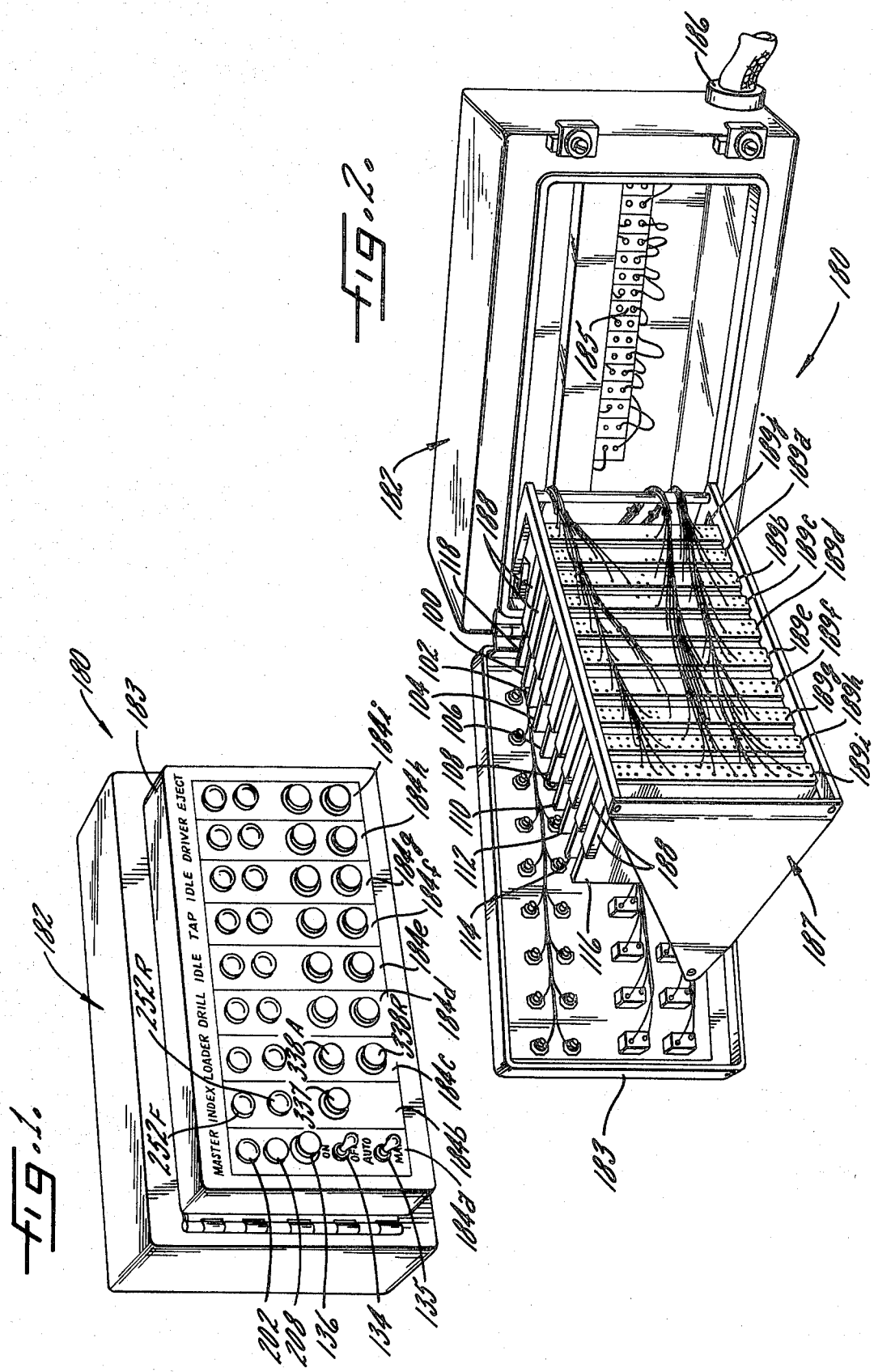
FIG. 2 is a perspective view looking at the front of the enclosure shown in FIG. 1, with the hinged front and the support frame swung away to reveal the control cards and the terminal board on the rear of the enclosure.

Referring to FIGS. 3 and 13a–13i, these figures depict the illustrative machine control system 18 constructed to direct the operation of the exemplary machine system 15 with a set of standardized control sections of the present invention including a standard master section 100, a standard signal converter section 118, a standard index section 102 for controlling the work table 50, two standard idle sections 108 and 112 operatively associated with the idle work stations 52b, 52d, and five standard unit sections 104, 106, 110, 114 and 116 for controlling respectively the loader 74, the drill 75, the tapper 76, the driver 77, and the ejector 78. The control circuit cards are assembled in a common enclosure 182 shown in FIGS. 1-2, and interconnected according to the schematic wiring diagram of FIGS. 13a-13i.

Thus, in FIG. 13a the master section is shown with its connections to its automatic and manual lights 202, 208, an on-off switch 134, and an auto-manual switch 135, all mounted on the control enclosure. The master section's connections to a power source (not shown) are also illustrated along with the connections to the machine system and the other sections of the control. In FIG. 13b there is illustrated the index section with its limit or interlock switches 63, 64, manual advance switch 337, and its forward and return lights 252F, 252R and further with its connections to the clutch and brake solenoids 58, 59 and the other sections of the control. In FIG. 13c the standard circuit of a standard unit section for the loader is shown with its associated switches 120F, 120R and 338A, 338R, lights 253F, 253R, and its connections to the loader's advance and return solenoids 92A, 92R and to the other sections of the control. In FIGS. 13d-i respectively, are illustrated the standard sections of the rest of the illustrative control system noted in FIG. 3 as idle section 108, tapper section 110, idle section 112, driver section 114 and ejector section 116 with their associated switches, lights and connectors

B. Control System Assembly

The control system assembly 180 for the set of standardized control sections comprises an enclosure 182 having a hinged front wall 183 which is divided into a plurality of panels 184a to 184i, each panel being associated with a standardized control section, but no panel being associated with the signal converter card 118. Mounted on the panels are the control switches and the indicator lights which are electrically connected to a terminal board 185 mounted on the back wall of the enclosure. For connecting the set of standardized control sections to a source of power and to the machine system, there is attached to the enclosure a connector 186 through which conductors pass to the terminal board.

For mounting the set of standardized control section cards in the enclosure 182, a frame 187 is pivotably connected to the enclosure. For each control section card the frame carries a pair of guides (only the top one 188 of each pair is shown) to slidably support its respective circuit card and a connector 189a to 180j which mates with the terminals on its card. A machine control system 180 is thus assembled by interconnecting the control cards and connecting the cards to their limit switches, control switches, solenoids, and indicator lights via the terminal board 185.

A control system constructed according to the invention is compact and self-contained in a minimum of space; additionally, there is little wiring involved in assembling and altering the control system when each standard circuit is comprised of integrated circuits on a printed circuit board. In addition, maintenance and wiring are significantly simplified by the use of the pivotable frame 187 for mounting the set of standardized control sections; when the frame is pivoted out of the enclosure 182 as in FIG. 2, the terminals of the switches and lights on the front wall, of the standard circuit connectors and of the terminal board are easily accessible. Even for much larger machine systems, comprising many smaller machine systems similar to the exemplary machine system, it is possible to provide a control system assembled as described herein which is compact, requires little wiring and is easily maintained compared to presently available control systems.

C. Control System Wiring Diagram

To facilitate an understanding of how the invention is carried out in practice, the illustrative control system 18 using a set of standardized control sections has been devised for the exemplary machine system 15 shown in FIG. 3. This control system includes the circuits of the respective standard circuit cards of the control sections, which are shown individually in FIGS. 4 to 6, 8 and 10, interconnected as diagrammatically shown in FIGS. 13a-14i. It will be understood that the logic gates used in the illustrative control 18 are NAND logic gates and that the electrical connections between the circuit elements on the individual circuit cards is by means of a printed circuit on each card.

Turning first to the master section 100 in FIG. 13a, to provide operating power for the control system, a potential source is interconnected with the control by the on-off switch 134 mounted on the master section panel 184a. The potential source supplies +48 V.D.C. on bus L1, ground potential on bus L2, +15 V.D.C. on bus L3, and +15 V.A.C. on bus L4.

With the auto-manual switch 135 set at its "off" position, as shown in FIG. 13a, when the on-off switch 134 is turned "on" for a typical cycle of operation, a positive voltage surge is immediately impressed through capacitor C1 in the master circuit onto the input terminal of gate 190 to cause the gate to generate a "universal reset" (UR) 0 pulse which is supplied to the master section and by the conductor 191 to the other sections in the control system to set all flip-flops to their proper states to commence operation of the control. In the master section the UR pulse is connected through a series of gates to gate 194 of auto-manual flip-flop 193 as a 0 pulse to drive the output of gate 194 to a 1 and the output of gate 195 to a 0. Thus, the UR pulse initially sets the auto-manual flip-flop to, as will be subsequently recognized, the condition for manual operation of the control. The UR 0 pulse also sets gate 198 of cycle start flip-flop 197 to a 1 output which cooperates with the output of gate 195 that has been inverted in gate 201 to a 1 level to set the output of gate 199 to a 0. Like the auto-manual flip-flop, the cycle start flip-flop is thus also set to its manual operating condition. The UR pulse also resets the forward memory flip-flops 216 and 261-1 to 261-5, which are two-state logic devices, of the index section and each of the unit sections in the control; each of these flip-flops must be reset at the beginning of a machine cycle before the corresponding workpiece support and the motion producing component will advance. The UR pulse is fed directly to gate 217 of the index forward memory flip-flop 216 to lock this flip-flop into its reset condition with the output of gate 217 a 1 and the output of gate 218 a 0. The UR pulse is operative to reset the forward memory flip-flops 261-1 to 261-5 of the standard unit sections such that gates 262-1 to 262-5 have 1 outputs and gates 263-1 to 263-5 have 0 outputs in the same manner that it resets the index forward memory flip-flop.

To operate the control system in its automatic mode of operation, the auto-manual switch 135 is shifted to its automatic position to connect both the "automatic cycle" (A) and the "manual cycle" (M) inputs of the master section to bus L2 and hold them at ground potential or a 0 level. This in turn causes the auto-manual flip-flop to be reset to its automatic condition with the output of gate 195 at a 1 and the output of gate 194 at a 0 which is operative to illuminate the automatic light 202 and to generate through three series connected gates a 1 "automatic/manual" (A/M) signal that, as a 1, inhibits the operation of the manual circuits of the index and the unit sections. The A/M signal, the CS signal, the "manual" "advance" (MA) signals, and the "manual return" (MR) signals are directive signals; that is, they direct the control sections to generate control signals that initiate work functions, either automatically or under manual control, if the predetermined interlock conditions prevail.

The master section 100 further includes circuit means for generating a CS signal that is operative in the automatic mode of operation to initiate a machine cycle, that is, a complete cycle of operation by the workpiece support and each of the motion producing components. When the feedback signals FMR and RU on conductors 205-1 and 206-1 respectively are 0 and FMS on conductor 207-1 is a 1, which will be the case if the UR pulse has properly set the forward memory flip-flops in the index section and in each unit section and if the workpiece support and the motion producing components are in their returned positions, the 1 output of gate 195 is operative with the FMR and RU signals through gate 201 to cause gate 199 to generate a 1 output. This 1 signal is operative with the 1 output from gate 204 resulting from the doubly inverted FMS signal, the UR signal which is a 1 after power is initially applied to the control, and a 1 "reset" (RS) signal to cause gate 198 to generate a 0 CS signal. Since the second input of gate 199 is tied to the output of gate 198 which is a 0, gate 199 will continue to generate a 1 even if the auto-manual flip-flop 193 should be set to its manual condition during a cycle. However, it is only when the control is operating in automatic and the feedback signals FMR and RU are both 0 and FMS is 1, which are their states at the beginning of an initial cycle and at the end of all machine cycles which were successfully completed, that the 0 CS signal is generated to initiate a machine cycle. Thus, in the automatic mode the CS circuit will repeatedly generate CS 0 signals which are connected by conductor 203 to the index circuit and then to the unit sections, and the machine and control systems will continue to operate as long as they perform correctly.

To commence operation of the control in its manual mode, it is merely necessary to apply power to the system by switching on-off switch 134 to its "on" position with the auto-manual switch 135 in its "off" or "manual" position. As previously explained, the UR pulse resets the automanual flip-flop 193 and the cycle start flip-flop 197 to their manual states; and with the auto-manual switch in either its "off" or "manual" position these two flip-flops will remain in their reset manual states. In the manual mode, the output of gate 194 of the cycle start flip-flop is a 1 and the output of gate 198 of the cycle start flip-flop, which is the CS signal, is a 1. A CS signal of 1 inhibits the operation of the automatic control circuits in the index section and the unit sections to allow manual control of the work support and the motion producing components if the A/M signal is a 0. The 1 output of gate 194 operates with the "1" output of gate 198 to effect the generation of a 0 output by gate 205 which is operative to illuminate the manual light 208 and generate a A/M signal of 0 which is connected to the index section by conductor 209 and then to the unit sections. It should be noted that in the manual mode of operation the feedback signals are ineffective to affect the logic states of the CS and the A/M signals, and, therefore, the control can operate in its manual mode even if the prior machine cycle was not completed successfully. Thus, the master section 100 is operative in the manual mode to generate an A/M signal of 0 level which prepares the index and the unit sections for manual control and a CS signal of 1 level which inhibits the automatic control circuits of the index and the unit sections.

A modification of the standard master section relating to the auto-manual switch which is particularly useful with large machine systems is shown in the master circuit 20 of FIG. 4. Quite often because of the large number of machines used in the larger machine systems, it is necessary to locate the machine control remote from the machine; this is an inconvenience when an operator wishes to control the operation of the machine system or a particular machine in the system while he tests or closely watches the operation of the particular system or machine. To provide the operator with this capability, a second remote auto-manual switching device herein comprising an "automatic" push button switch 211 and a "manual" push button switch 210 is connected between ground potential and the master section. With the switch 135 in its off position, as shown, the control can be placed in its automatic mode by depressing the remote "automatic" switch 211 to place the "remote automatic" (RA) and the "remote manual" (RM) input terminals at ground potential or in its manual mode by depressing the remote manual switch 210 to place the RA and the RM terminals at 1 levels. For safety purposes if either switch 135 or the remote switching device 210, 211 is in its manual position, it will override the other switch in its automatic or off position so that the control operates in its manual mode.

Referring now to the control section 102 illustrated in FIG. 13b, in order to rotate the workpiece support 50 through a full cycle in either the automatic or manual mode of operation, one of the gates 221, 222 or 223 in the index section 102 must generate a 0 which is operative to cause amplifier means 225 to activate the clutch 58 and deactivate the brake 59. Referring to FIG. 12, there is illustrated a preferred embodiment of amplifier means 225 which comprises a D.C. amplifier 226 to drive clutch 58 and a D.C. amplifier 227 to drive brake 59. When gate 229 generates a 0 relay 231 is actuated to close switch 232 and open switch 232'. With switch 232 closed triac 233 is triggered to its conducting state and in combination with the variable resistor 234 and its associated resistors provides an A.C. voltage, the potential of which can be varied by adjusting resistor 234, which after being rectified in full wave rectifier 235 drives the clutch 58. When all three of the gates 221, 222 and 223 provide 1 levels, gate 229 will provide a 1 and relay 231 will be deactivated to open switch 232 turning off triac 233 and deactivating clutch 58 and to close switch 232' activating triac 233' and brake 59.

With control 18 in its automatic mode the table 50 will begin rotating when the index section receives a 0 CS signal from the master section indicating that the table and the motion producing components are in their returned positions and all the forward memory flip-flops are reset. Because the index forward memory flip-flop 216 is reset, the output of gate 217 is a 1 which is fed to gate 222; a second input to gate 222 is an inverted CS signal and a third input is a 1 which is the inverted "first automatic interlock" (AI-1) signal. These three 1 inputs cause gate 222 to generate the 0 required to activate clutch 58 to rotate the table. It should be noted that the AI-1 signal corresponds to the RU feedback signal on conductor 206-2 that is a 0 when all the motion producing components are in their returned positions, which is thus an interlock condition for commencement of rotation of table 50 in the automatic mode to index the workpieces to their work stations. In the automatic mode gate 223 will always produce a 1 output signal because the 1 A/M signal after being inverted to a 0 is an input to that gate. At the initiation of the machine cycle with the table in its return position the return limit switch 63 is closed to provide a 0 "table returned" (TR) signal that is fed directly to gate 221 to insure that that gate produces a 1; in addition, at the beginning of the cycle, the second input signal to gate 221 is the output of gate 218 which is a 0. Thus, in the automatic mode to commence or continue rotation of the table 50 at the beginning of a machine cycle, the amplifier means 225 is actuated exclusively by gate 222 to energize clutch 58.

Several of the input signals to the index section change as the table rotates and its cycle of operation progresses to affect the manner in which the amplifier means 225 effects the operation of the clutch. As soon as the table begins its rotation, cam element 62 releases limit switch 63 to provide a 1 TR signal which switches a first input of gate 221 to a 1. This condition continues until the workpiece support has indexed the workpieces to their proper work stations and cam element 62 completes approximately 120° of a cycle of rotation and closes forward limit switch 64 to generate a 0 "table forward" (TF) signal which sets the index forward memory flip-flop by triggering gate 218 to generate a 1. With the returned limit switch 63 opened the TR signal, after being inverted to a 0, triggers gate 240 to produce a 1 which is operative with the 1 UR signal and the 1 output of gate 218 to switch gate 217 to a 0 output signal to lock the index forward memory flip-flop in its set state. The 0 output signal of gate 217 now switches gate 222 to a 1 output level which is incapable of actuating amplifier means 225 to continue driving clutch 58; however, the 1 output signal of gate 217 in conjunction with the 1 TR signal switches gate 221 to a 0 output to continue driving the clutch. In addition, when the table is advanced and the index forward memory flip-flop is set, the 1 output of gate 218 is operative to illuminate the forward light 252F and continues to illuminate it until the table reaches its returned position.

To initiate an automatic cycle of operation by the motion producing components after the table has been indexed to position the workpieces, the index section generates an "index cycle other units" (I/COU) signal. To generate this I/COU signal, the CS signal is inverted in the index section and fed to gate 241 as a 1; the second input to this gate is connected to the output of a gate 218 and is thus locked at a 1 when the table is advanced and the index forward memory flip-flop is set. In response to the two 1 input signals gate 241 generates the 0 I/COU signal which is connected to the CS inputs of each of the unit sections and the idle sections by conductor 242. In effect, the index section delays the CS signal until the table 50 has advanced to position the workpieces and then transmits the CS signal as the I/COU signal to the other control sections.

Since the clutch remains actuated and the brake deactuated after the table has advanced, the drive motor 57 continues to operate; however, the Ferguson or Geneva motion type gear used in the machine system 15 stops the rotation of the table in its advanced position so that the motion producing components can perform their work functions. As the drive motor continues to operate, the cam element 62 rotates to its return position releasing the forward limit switch 64 and causing the TF input signal to switch to a 1. The 1 TF signal is ineffective to change the state of the index forward memory flip-flop 216 because the 0 output of gate 217 has gate 218 locked at a 1 level output and gate 217 is unaffected by the change of the TF signal to a 1. Therefore, gate 221 continues to control the amplifier means 225 and gate 241 continues to generate a 0 I/COU signal; further the output of gate 218 continues to illuminate forward light 252F to indicate that the table has advanced. When the cam element has rotated through an additional 240°, it strikes returned limit switch 63 indicating that the machine cycle has been completed and once more switching the TR input signal to a 0. As will be explained in detail subsequently, the CS signal generated by the master section is at this time momentarily shifted to a 1 if the table and all the motion producing components have successfully been returned. This 1 CS signal is operative in the index section with the TR signal and the 1 output of gate 242 to cause gate 240 to generate a 0 signal which resets the index forward memory flip-flop. The returned light 252R is illuminated for as long as the table is in its returned position, but the forward light 252F is extinguished as soon as the index forward memory flip-flop is reset. If the workpiece support and all the motion producing components have successfully completed their cycles of operation, the feedback signals FMR, RU and FMS will then once again cause the master section to generate another 0 CS signal to initiate the next cycle of operation.

To insure that the machine does not operate unless an operator is present, a foot switch 245 (FIG. 5) can be added to the index section. If the switch is not closed to generate a 0 "second automatic interlock" (AI-2) input, gate 229 cannot generate the 0 required to energize the clutch. If this switch is opened at any time during a machine cycle, the clutch will be deactivated and the cycle will terminate immediately or, if the table is advanced when the motion producing components have completed their cycles of operation. The index circuit 21 is also illustrated as having an "index forward memory reset" (I/FMR) output and an "index forward memory set" (I/FMS) output; these outputs coincide with the outputs of gates 218 and 217 respectively of the index forward memory flip-flop, and thus indicate the progress of the work support's cycle of operation. As a result, these signals can act as interlock signals.

Since the standard unit circuits in the control 18 operate in the automatic mode in basically the same manner, the description of such operation will be limited to the circuit of the loader standard unit section 104, illustrated in detail in FIG. 13c. In addition, since each of the standard unit sections generally includes the same circuit elements, common circuit elements are identified by the same reference numeral suffixed by a –1, –2, –3, –4 or –5 to indicate the particular unit section. Because a preferred embodiment of a complete standard unit circuit is illustrated in FIG. 6, those inputs and outputs and those circuit elements in the standard unit sections of control 18 which are not used, particularly in the auxiliary circuitries and the time delay networks, are not illustrated in the wiring diagram of FIGS. 13a–13i to avoid confusion and making the control circuit more complex than is necessary.

Figure 11:
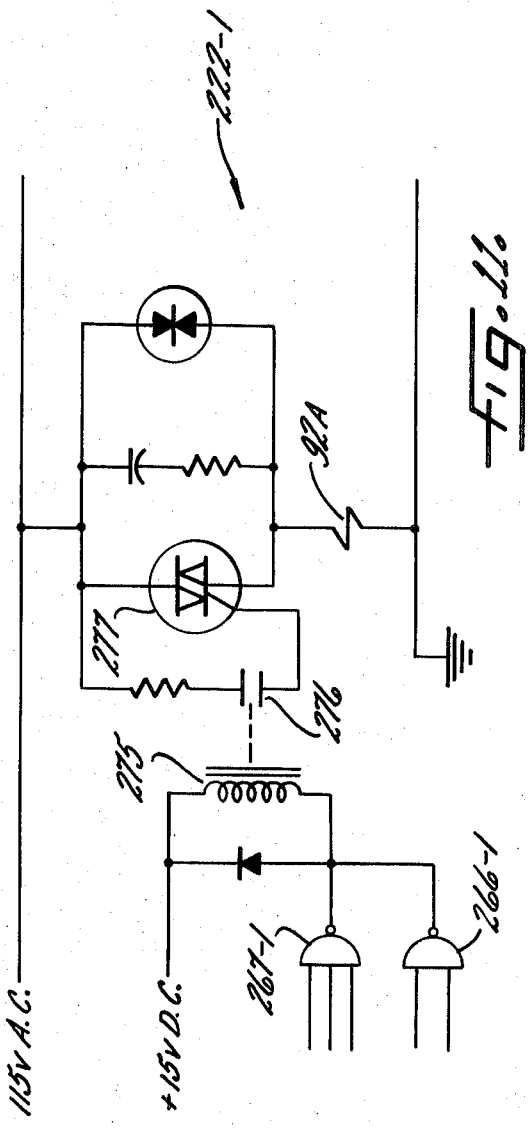
FIG. 11 is a schematic diagram of an AC amplifier used in the standard unit circuit of FIG. 7 to provide the power to operate a motion producing component.

In order to advance the loader in either the automatic or the manual mode of operation, either gate 266–1 or gate 267–1 must generate a 0 to cause A.C. amplifier 268–1 to energize the loader advance solenoid 92A; in the same way it is necessary for either gate 270–1 or gate 271–1 to generate a 0 to cause an A.C. amplifier 272–1 to energize the loader return solenoid 92R to return the loader from its advanced position. Referring to FIG. 11, there is shown a preferred embodiment of an A.C. amplifier which can be used in the unit sections to energize the solenoids of the machine system. When gate 266–1 or 267–1 generates a 0, a relay 275 is actuated to close switch 276, as a result of which triac 277 is triggered to conduct and provide an A.C. voltage to energize solenoid 92A. When neither gate 266–1 nor gate 267–1 generates a 0, switch 276 is open so that triac 277 does not conduct and the advance solenoid is not energized.

With control 18 in its automatic mode the loader advance solenoid 92A will be energized when the loader unit section 104 receives a 0 I/COU signal from the index section 102 indicating that an automatic cycle has begun and that the table 50 has been advanced. With the loader forward memory flip-flop 261–1 in its reset condition, that is, the output of gate 262–1 is 0 and the output of gate 263–1 is 1 as is the case at the beginning of a cycle of operation when the loader is in its returned position, and the "automatic advance interlock" (AAI) signal at a 1 level indicating the presence of the predetermined interlock condition for the automatic advance of the loader, which is that the drill 75 be in its returned position, gate 266–1 will generate a 0 when a 0 I/COU signal is received on the CS input terminal and the loader will begin advancing to load a workpiece on the work holder 53a at work station 52a. The AAI signal operates to inhibit the generation of a 0 by gate 266–1 except when this predetermined interlock condition is met; when the drill is in its returned position, a 0 is connected to gate 280 of the auxiliary circuitry of the loader unit section by conductor 281, is inverted, and is directed by a conductor 282 to the AAI input as a 1 which allows the gate 266–1 to generate the required 0 signal. When the loader reaches its advanced position, the forward limit switch 120F is closed and a 0 unit forward (FU) signal is produced which sets the two state logic device, that is, the loader forward memory flip-flop, to generate position or cycle progress signals indicating that the loader is advanced.

In its set state the loader forward memory flip-flop by means of the 0 output from gate 263–1 causes gate 266–1 to generate a 1 and thus de-energize advance solenoid 92A. At the same time, the 1 output of a gate 262–1 illuminates the forward light 253F, which remains lit until the loader has been returned and the loader forward memory flip-flop has been reset, and in combination with an "automatic return interlock" (ARI) 1 signal, which signifies that the drill has successfully completed its cycle of operation, causes gate 270–1 to generate a 0 which actuates amplifier 272–1 to energize the return solenoid 92R to return the loader to its loading position. Thus, after the loader has advanced to position a workpiece on a workpiece holder, the loader remains advanced until the drill has moved forward to drill a hole in the workpiece and has returned; when the drill has completed its work function, the drill forward memory flip-flop 261–2 (FIG. 13d) is reset and gate 263–2 generates a 1 "unit forward memory set" (U/FMS) signal which is directed to the ARI input of the loader unit section by conductor 285 to allow a gate 270–1 to generate a 0 return signal. When the loader has returned, limit switch 120R is once again closed to generate a "unit returned" (RU) 0 signal. As noted previously, when the workpiece support and all the motion producing components have returned, the master section generates a 1 CS signal which is relayed to the loader unit section as a 1 I/COU signal which is operative with the RU and the A/M signals to switch gate 286–1 to a 0 output and thus reset the loader forward memory flip-flop 261–1, which in turn extinguishes the forward light 253F and illuminates the return light 253R. When all the forward memory flip-flops are reset, the master section generates another 0 CS signal to initiate the next machine cycle.

As previously explained, to initiate a complete automatic cycle of operation of the machine system 15, the master section 100 generates a 0 CS signal and a 1 A/M signal. The CS 0 signal causes the index section 102 to energize the clutch 58 and de-energize the brake 59 to rotate the table 50 to position the workpieces for performance of the work functions. When the table has been advanced, the index section generates an I/COU 0 signal which is connected to all the unit sections to initiate the cycles of operation of the motion producing components.

The I/COU signal causes the loader 74 to advance to place a workpiece on the work holder 53a if the automatic advance interlock condition that the drill be returned is fulfilled. When the loader has advanced and its loader forward memory flip-flop has been set, the loader unit section 104 provides a 1 "unit forward memory reset" (U/FMR) signal which is connected by conductor 288 to the AAI input of the drill unit section 106; this U/FMR signal, which is used as a selected interlock signal, allows gate 266–2 to generate a 0 signal to activate the drill advance solenoid 93A. The drill, which was readied to advance by the I/COU signal, can now advance to drill a hole in the workpiece. However, instead of immediately returning after reaching its advanced position, the drill continues to drill for a short period to insure that the hole is clean and extends completely through the workpiece. This delay is accomplished by a time delay network 149–2 in the drill unit section which is mounted on the drill's printed circuit card with the other circuit elements. A 1 " start timer" (ST) input provides a 0 output on terminal TO with no delay; whereas, a 0 input provides a 1 after a time delay determined by adjustable timer network 291, which can be any timing system that is compatible with the circuits used in the control system. Before the drill is advanced, the timer network 291 and gate 293 generate 1 outputs in response to the 1 ST signal; these two 1 signals cause gate 292 to generate a 0. But when the drill is advanced, the 0 FU signal is connected to the time delay network's ST input by conductor 295; in response to the 0 ST signal the timer network 291 generates a 0 output after timing the predetermined time delay which switches gate 292 to a 1 level to provide a 1 TO signal and set timer flip-flop 294. Because the TO signal is connected to the ARI terminal of the drill unit section by conductor 296, gate 270-2 is incapable of generating a 0 for energizing the return solenoid 93R until the time delay network provides a 1 TO signal; thus at that time the drill is returned and the drill forward memory flip-flop 261-2 is reset to provide a 1 U/FMS signal which is fed back to the ARI input of the loader unit section to allow the loader return solenoid 92R to be energized to return the loader to its loading position.

At the same time that the loader is actuated to advance, the I/COU signal causes the tapper unit section 110 (FIG. 13f) to energize the tapper advance solenoid 94A. An interlock condition which must have been met, however, before the solenoid 94A can be energized is that the part-in-position switch 82 must have been momentarily tripped closed as the table was being indexed to indicate that the workpiece 51c being indexed to work station 52c was properly positioned on its work holder 53c so that the tapper is aligned with the hole in the workpiece. When the switch 82 is temporarily closed by a workpiece, a 0 is fed to gate 300 which is part of the auxiliary circuitry of the tapper unit section causing the gate to generate a 1 signal which is connected by conductor 301 to an input of an auxiliary circuitry gate 302 which forms a flip-flop with gate 300. The second input to gate 302 is also 1 because this input is connected to the tapper FU input by conductor 303; thus gate 302 generates a 0 which is connected to the tapper "cycle unit" (CU) input by conductor 304. The CU input must be a 0 for the tapper forward memory flip-flop 261-3 to be reset, which is a requirement for energizing advance solenoid 94A. This condition is required for all the unit sections; as can be seen, the loader and drill unit sections that do not have part-in-position switches connected to their CU inputs have these inputs tied to ground potential. When the tapper has been advanced, its FU signal becomes a 0 which changes the output of gate 302, the tapper CU signal, to a 1 level at which it remains until switch 82 is once again closed by a properly positioned workpiece which is being indexed to work station 52c and resets the tapper forward memory flip-flop to immediately advance the tapper. When the tapper is advanced, the tapper forward memory flip-flop is set; the 1 output of gate 262-3 immediately causes amplifier 272-3 to energize return solenoid 94R to return the tapper as the advance solenoid 94A is de-energized.

There is associated with work station 52e a part-in-position switch 81 which determines whether the workpiece on the work holder at this work station is properly aligned so that the screwdriver can drive its screw into the tapped hole in the workpiece. When the workpiece is so positioned, the switch 81 generates an interlock CU 0 signal which is operative with the I/COU signal to reset the forward memory flip-flops of the driver and the ejector unit sections to initiate a cycle of operation of the screwdriver and the ejector. When the screwdriver has advanced to drive its screw into the workpiece, the advance limit switch 126F (FIG. 13h) is closed to set driver forward memory flip-flop 261-4 which immediately and automatically causes the screwdriver to return since there are no ARI signals to hold it in its advanced position. Though the I/COU 0 signal is also operative to prepare the ejector unit section 116 (FIG. 13i) to advance the ejector, a pair of AAI signals hold the ejector in its returned position until the selected predetermined interlock conditions prevail. The ejector will advance only when the driver is in its returned position such that return limit switch 126R provides a 0 signal on conductor 308 which is inverted in auxiliary circuitry gate 309 and then directed by conductor 310 to the AAI input of the ejector unit section and when the driver has successfully completed a cycle of operation to reset the driver forward memory flip-flop and generate a U/FMS 1 signal which is directed by conductor 311 directly to the AAI input of the ejector unit section. The second interlock requirement is provided so that if the screwdriver does not insert a screw into the workpiece, the workpiece will not be ejected, but can be rejected manually. Once the ejector has advanced and ejected its workpiece, forward switch 128F is closed to set the ejector forward memory flip-flop 261-5 and immediately and automatically return the ejector to its initial position.

At work stations 52b and 52d there are no work functions performed. Therefore, there is provided in the control 18 standard idle cards which maintain the feedback loop and provide circuit means for illuminating the forward and return lights associated with those work stations. The idle section 108, which is identical to the idle section 112, has logic means for illuminating its forward light 255F only when a I/COU signal is received on its CS input; however, the return light 255R is illuminated at all times when power is provided to the control. It should be noted that the control as presently constituted does not provide standard control sections for work stations 52f, 52g and 52h; however, if it were necessary to provide work functions at these stations, the control assembly 182 need only be enlarged to include guides and connectors for the required control sections and the added pre-engineered and pre-wired sections wired into the control system to direct the additional motion producing components at these work stations.

To generate a 0 CS signal for initiating in the automatic mode a cycle of operation by the machine system when the workpiece support and the motion producing components have successfully completed a prior complete cycle of operation and are in their returned positions, each of the control sections includes a feedback circuit means interconnected by the set of conductors 205, 206 and 207 with the feedback circuit means of other control sections in the control to provide a series feedback loop which relays to the master section the series of feedback or positive sequence interlock signals. The first standard unit section in the feedback loop, which is the ejector unit section, has its three feedback inputs U, V and W tied by the conductors 206-9, 205-9 and 207-9 respectively to ground potential. When the ejector 78 is in its returned position after having completed its cycle of operation, the ground potential on the U feedback input is operative with the ejector RU signal to generate in gate 316–5 a 0 signal which is then directed from the feedback output X by comparator 206–8 to the U input of the driver unit section 114 where another 0 signal is generated when the driver is in its returned position. This 0 feedback signal is then fed serially through the idle section 112 to the tapper section 110; when the tapper is returned, through the idle section 108 to the drill section 106; when the drill is returned, to the loader section 104; when the loader is returned, to the index section 102; and finally when the table is returned, this 0 feedback signal is fed to the RU input of the master section 100 to indicate that the table and all the motion producing components are in their returned positions. If any one of the table and the motion producing components is not in its returned position, the RU feedback signal to the master section will be a 1. When a motion producing component initially returns to its returned position, its forward memory flip-flop is in the set condition. For instance, gates 262–5 and 263–5 of the ejector unit section will be producing a 1 and a 0 respectively when the ejector is first returned. This 1 output of gate 262–5 is operative in gate 317–5 with the feedback input signal W to generate a 0 Z feedback signal and this 0 output of gate 263–5 is operative in gate 315–5 to generate a 1 Y output feedback signal. These two feedback signals are relayed through the series feedback loop of the control sections in basically the same way as the RU feedback signal and maintain their respective logic levels as long as each of the forward memory flip-flops is in its set position until they reach the master section as a 1 FMR feedback signal and a 0 FMS feedback signal. The 0 RU and 0 FMS signals are then operative to cause gate 204 of the master section to generate a 0 which effects the generation of a 1 CS signal by gate 198 which resets the index forward memory flip-flop 216 in the index section and causes that section to generate a 1 I/COU signal that resets the forward memory flip-flop of each of the unit sections. When the forward memory flip-flop of each unit section is reset, the logic levels of the FMS and FMR feedback signals are inverted, such that the FMS signal becomes a 1 and the FMR signal becomes a 0. Both the FMR and RU signals are now operative with the 1 output of gate 195 to cause gate 201 to generate a 0 that once again switches the state of the cycle start flip-flop 197 causing the output of gate 199 to go to a 1 which is operative with the FMS signal to switch the output of gate 198 to a 0. Since the CS signal is the output of gate 198, the CS signal is once again a 0 that is effective to initiate a new cycle of operation.

Thus each unit section's forward memory flip-flop 261 and gates 315, 316 and 317 with their associated circuit elements operate as a memory storage device in which is stored a representation that the unit's corresponding motion producing component has advanced and returned. These representations are then provided to the master section through the feedback loop as the positive sequence interlock signals RU, FMR and FMS. In response to these signals indicating a successful completion of a machine cycle, the master section generates another 0 CS signal which initiates another machine cycle. In this manner, there is provided according to the present invention a method of controlling machine systems such that a new cycle of machine functions will be initiated only if the prior cycle was successfully completed.

In the illustrative control system 18 the generation of the cycle start signal to initiate each machine cycle of work functions is dependent upon the successful completion of work functions by all the motion producing components of the exemplary machine system. However, where it is desired to initiate a new cycle of work functions when only a chosen set of the components in a machine system have successfully completed their work functions, it is merely necessary to wire only the feedback inputs U, V and W and outputs X, Y and Z of those unit sections corresponding to the chosen set of components into a feedback loop to the master section. In this way the master section receives information only concerning the successful completion of work functions by this set of components and will generate a cycle start signal independent of the operation of those components not included in the chosen set of components.

If there is a malfunction during a cycle of operation by the machine system, the control 18 will be unable to initiate a new cycle of operation. If, for instance, one of the motion producing components does not return, the RU feedback signal will remain at a 1 level and will be unable to generate a 1 CS signal which is necessary to reset the forward memory flip-flops in the control sections; if the forward memory flip-flops are not reset, the control sections will be incapable of advancing the motion producing components at the beginning of the next cycle of operation. If, on the other hand, one of the motion producing components does not advance during its cycle of operation, the FMS and FMR feedback signals will be incapable of generating the required momentary 1 CS signal.

There is also provided in the master section a reset capability for use in the automatic mode to stop the operation of the machine system and its control and to return all the motion producing components to their returned positions if, for instance, there is a malfunction in the machine or control system. When the reset button 136 is depressed, the "reset" (RS) input terminal of the master section is locked at a 0 level that is operative through a series of gates to drive the outputs of gates 194 and 320 to 1's; these two outputs then drive the output of a gate 195 to a 0 such that the auto-manual flip-flop 193 is shifted to its manual condition. The RS input also drives the gate 198 to a 1 output which is operative with the 0 output of gate 195 operating through gate 201 to the drive output of gate 199 to a 0 such that the cycle start flip-flop 197 is also shifted to its manual condition. Thus the master section is switched to its manual mode of operation with the CS signal a 1 and the A/M signal a 0, and the automatic operation of the control is terminated.

In order to have each unit section automatically return its corresponding motion producing component, the RS signal is carried to each of the unit sections in the control by a conductor 321. Since the effect of the 0 RS signal on each of the standard unit sections is identical, only its effect on the loader standard unit section 104 is described herein with the understanding that the description is equally applicable to the other four unit sections. The RS signal is operative with the A/M signal to cause the manual return gate 270–1 to generate a 0 level that causes amplifier 272–1 to activate the return solenoid 92R to return the loader 74;

the automatic and the manual advance gates, 266-1 and 267-1 respectively, are deactivated by the 1 CS signal and the 0 A/M signal respectively so that the advance solenoid 92A is made inoperative when the reset switch 136 is closed. In the same manner, the return solenoids of the drill, the tapper, the driver, and the ejector are simultaneously activated to return these parts to their start positions. Because the RS signal is not connected to the standard index circuit, the table 50 continues to operate until it has completed its cycle at which time the clutch 58 is deactivated and brake 59 activated to stop the table in response to the 1 CS signal. Thus, by merely activating the reset button during an automatic cycle, an operator can immediately return the table and motion producing components and switch the machine and its control to the manual mode of operation.

To switch the control 18 from its automatic mode to its manual mode, it is only necessary to switch the auto-manual switch 135 into its manual position from its automatic position such that there is generated in the master section an A/M signal having a 0 level for preparing the manual circuits in the index and each of the unit sections for manual operation and a CS signal having a 1 level for inhibiting the operation of the automatic circuits in the index and the unit sections. With the table in its returned position, before the manual advance button 337 is depressed, the index forward memory flip-flop 216 is in its reset state so that neither gate 221, 222 nor 223 generates a 0 to energize clutch 58 and de-energize brake 59. When the manual advance switch 337 is depressed, a 0 is applied to the MA input and is operative with the other inputs to gate 223 to cause that gate to generate a 0 to energize the clutch and de-energize the brake to begin rotating the table. As the table arrives at its advanced position, a cam element 62 depresses its advance limit switch 64 to apply a 0 signal to the TF input that sets the index forward memory flip-flop; with this flip-flop set the output of gate 217 is 0 and thus gate 223 is no longer able to generate the 0 signal needed to energize the clutch. However, the output of gate 218 is a 1 and is tied to an input of gate 221, the secnd output of which is tied directly to the TR input which is a 1 when the table is in its advanced position. Therefore, gate 221 generates a 0 which is operative to maintain the clutch in an energized state and the brake in a de-energized state so that the drive motor continues to operate, though the table does remain in its advance position because of the Ferguson or Geneva-motion type gear. The drive motor continues to rotate until the cam element 62 strikes the return limit switch 63 to generate a 0 TR signal which is connected directly to gate 221 to de-energize the clutch and energize the brake and complete the cycle of rotation. To rotate the table a second time in the manual mode, it is necessary to release the manual advance switch 337 to generate a 1 MA input. This MA 1 is operative with the other 1 inputs to gate 240 to generate a 0 output that resets the index forward memory flip-flop. When the switch 337 is subsequently depressed, the 0 MA input is inverted and fed to gate 223 where it is operative with the 1 level inputs to generate a 0 output signal for energizing the clutch and de-energizing the brake to begin the new cycle of operation.

The A/M 0 signal from the master section is effectively delayed in the index section until the table has completed its cycle of operation and has returned. The A/M 0 signal from the master section is directed to a gate 350; however, until the table has returned to generate a 0 TR input signal which is also directed to gate 350, this gate does not generate the required "manual table returned" (M/TR) 0 signal which is directed to the A/M inputs of the unit sections by a conductor 351 to place each of these units in the manual mode.

Since each of the standard unit circuits in the control 18 operates basically the same, the general description of such operation in the manual mode will be limited to the circuit of the loader standard unit section 104. At the beginning of the cycle with the loader in its return position and the manual advance switch 338A open, gate 286-1 will generate a 0 which guarantees that the loader forward memory flip-flop 261-1 is in its reset position to begin a cycle of operation. When the manual advance switch is closed; a 0 signal is applied to the MA input which causes gate 267-1 to generate a 0 output signal that is operative to cause amplifier 268-1 to energize the advance solenoid 92A to advance the loader. It is necessary to maintain the switch 338A in its closed position until the loader has advanced completely. When the loader arrives at its advanced position, the limit switch 120F is closed to generate a 0 FU signal which is operative to set the loader forward memory flip-flop with the result that gate 267-1 now generates a 1 signal which is incapable of energizing the advance solenoid 92A. The manual advance switch 138 is now released and the manual return switch 388R depressed to generate a 0 MR input signal which is operative with the A/M input signal to generated in gate 271-1 a 0 output signal which is operative to energize the return solenoid 92R to return the loader. When the loader is returned, the RU signal becomes a 0 that again causes gate 286-1 to generate a 0 output which is operative to reset the forward memory flip-flop to prepare the loader section for the next manual cycle of operation.

It is common to require that predetermined interlock conditions be met before a manual operation can be performed to insure, for example, that motion producing components that are operative at a common work station do not interfere with one another. This is exemplified by the operations of the loader and the drill at work station 52a and of the screwdriver and the ejector at work station 52e. The RU input of the drill unit section is connected through conductors 281 and 282 and the gate 280 of the auxiliary circuitry of the loader unit section to the "manual advance interlock" (MAI) input of the loader unit section to insure that the loader cannot be manually advanced unless the drill is in its returned position so that the loader does not advance and strike the drill. To guard against the screwdriver and the ejector colliding, the MAI input of the driver is connected by conductors 355 and 356 and a gate 357 of the driver auxiliary circuitry to the RU input of the ejector unit section so that a driver will not advance unless the ejector is in its returned position and the MAI input of the ejector unit section is connected by conductors 308 and 360 and a gate 361 to the RU input of the driver unit section so that the ejector will not advance to eject a workpiece unless the driver has returned. In addition, to insure that the screwdriver does not drop a screw onto the table when the workpiece is not properly positioned at work station 52e, the part-in-position switch 81 is connected through conductors 355 and 363 and a gate 364 in the driver auxiliary circuitry to the MAI input of the driver so that the driver can advance in the manual mode only if the workpiece is properly positioned to receive the screw from the driver.

There are several safety features in the set of standardized control sections when they are assembled into a control to insure that there is no damage to the control or the machine system if a manual advance or return button is inadvertently pushed. Referring to FIG. 6, if both a manual advance and a manual return button of a unit section are pushed simultaneously, the manual return button will override the manual advance button and the motion producing component will be returned. The 0 MR input is applied to the input of gate 267 to override the MA input and insure that amplifier 268 produces a 1 output; additionally, the 0 MR input is operative to cause gate 271 to generate a 0 output which energizes the corresponding return solenoid. If in the automatic mode of operation a manual advance or a manual return button of one of the unit sections is pressed, the corresponding unit section will not respond to the manual button because a unit section must have a 0 A/M input signal in order for its manual advance and return buttons to be operative.

I claim as my invention:

1. A set of interconnectable standardized control sections for assembling controls for machines having motion producing components operable each machine cycle in repetitive advance and return cycles to perform work functions in a predetermined sequence in accordance with predetermined interlock conditions comprising, in combination, a plurality of standard unit sections and a standard master section, each of said sections including a card with a multiplicity of circuit elements mounted on said card and a printed circuit interconnecting said elements to form circuits;

the circuit elements of each unit section, when interconnected in a control, comprising circuit means for generating control signals for controlling a corresponding component, circuit means actuated by selected interlock signals to control the generation of said control signals, and circuit means for generating feedback signals representing successful completion of machine functions by a set of said components including the component corresponding to the respective unit section; and said master section circuit elements, when interconnected in a control, comprising means for generating a cycle start signal in response to feedback signals representing successful completion of a full cycle of work functions by said components, said cycle start signal being effective to activate each unit section to generate control signals to automatically initiate a new cycle of operation by said components.

2. The combination comprising a set of standardized control sections as defined in claim 1 interconnected in a control for machines having motion producing components operable each machine cycle to perform work functions in a predetermined sequence in accordance with predetermined interlock conditions.

3. A set of interconnectable standardized control sections as in claim 1 wherein said control signal circuit means of each unit section comprises a circuit means for generating a signal indicative of the progress of the advance and return cycle of said corresponding component;

means operative in response to said cycle start signal and to said cycle progress signal indicating that said corresponding component is in its returned position to generate under the control of said interlock circuit means a control signal to advance said corresponding component; and means operative in response to said cycle progress signal indicating that said corresponding component has advanced to generate under the control of said interlock circuit means a control signal to return said corresponding component to complete its advance and return cycle.

4. A set of interconnectable standardized control sections as defined in claim 3 wherein said cycle progress circuit means includes a two-stage logic device which is set to a first state when said corresponding component has advanced during its advance and return cycle and is reset to a second state when said corresponding component has returned to complete its advance and return cycle in order to generate said cycle progress signal.

5. A set of interconnectable standardized control sections as defined in claim 3 wherein said interlock circuit means comprises an advance interlock means operable in response to selected interlock signals for controlling the generation by said advance control signals means of a control signal to advance said corresponding component only in the presence of predetermined interlock conditions; and a return interlock means operable in response to selected interlock signals for controlling the generation by said return control signal means of a control signal to return said corresponding component only in the presence of predetermined interlock conditions.

6. A set of interconnectable standardized control sections as defined in claim 1 wherein said circuit elements of each unit section further comprises electrically isolated, auxiliary circuitry means interconnectable with said circuit elements of said standard unit sections to provide selected interlock signals to said interlock circuit means.

7. A set of interconnectable standardized control sections as defined in claim 1 wherein said feedback signal circuit means is interconnectable with the feedback signal circuit means of other standard unit sections to form a feedback loop, each feedback means being operative to generate feedback signals in response to other feedback signals indicating that the corresponding components of the prior unit sections in said feedback loop having successfully completed their work functions and in response to interlock signals indicating that said respective unit section's corresponding component has successfully completed its work function, said master section generating the cycle start signal in response to the feedback signals in said feedback loop indicating successful completion of a full cycle of operation by said components.

8. A set of standardized control sections interconnectable to form controls for a variety of machine types having motion producing components cyclically operable to perform work functions in a predetermined sequence and in accordance with predetermined interlock conditions comprising, in combination,
- a plurality of standard unit sections and a standard master section;
- each standard unit section, when interconnected in a control, having a unit logic circuit to control the operation of a corresponding motion producing component and electrically isolated, auxiliary logic circuitry interconnectable with the unit logic circuits of said unit sections to coordinate the operation of said components in accordance with said predetermined interlock conditions in response to selected interlock signal; and
- said standard master section, when interconnected in a control, having a master logic circuit interconnectable with said unit logic circuits to initiate automatically a new cycle of operation of said components upon the successful completion of a full cycle of operation of said components.

9. A set of standardized control sections interconnectable to form controls for machine systems having motion producing components operable to perform a cycle of work functions according to a predetermined sequence and predetermined interlock conditions comprising, in combination,
- a standard master section and a plurality of standard unit sections;
- said standard master section, when interconnected in a control, having selectively operable circuit means for generating signals determinative of either an automatic or manual mode of operation of the control and cycle start signals for automatically initiating full repetitive cycles of work functions by said components in the automatic mode upon successful completion of a full cycle of work functions by said components; and
- each standard unit section, when interconnected in a control, having independent circuit means sharing certain of the circuit elements and operable in response to both said operating mode and cycle start signals to generate control signals for controlling a corresponding motion producing component, and interlock means actuated by selected interlock signals to control the generation of said control signals to insure that said components are operable to perform their work functions according to the predetermined sequence and the predetermined interlock conditions.

10. The combination comprising a set of standardized control sections as defined in claim 9 interconnected in a control for machine systems having motion producing components operable each machine cycle to perform work functions according to a predetermined sequence and predetermined interlock conditions.

11. A set of standardized control sections interconnectable to form controls for machines having motion producing components operable to perform a cycle of work functions in a predetermined sequence in accordance with predetermined interlock conditions on workpieces carried by an indexable workpiece support comprising, in combination,
- a plurality of standard unit sections, a standard index section, and a standard master section;
- each standard unit section, when interconnected in a control, having circuit means to generate control signals for directing the performance of a work function by a corresponding motion producing component, circuit means operable in response to selected interlock signals to control the generation of said control signals, and feedback circuit means interconnectable with feedback circuit means of other unit sections to form a feedback loop and operable to generate feedback signals representing successful completion of work functions by a set of said components including the component corresponding to the respective unit section;
- said standard index section, when interconnected in a control, having means to generate a control signal for directing the indexing of said workpiece support and feedback means interconnectable in said feedback loop to generate feedback signals representing the successful completion of a machine cycle by the successful indexing of said workpiece support and by the successful performance of work functions by said components; and
- said standard master section, when interconnected in a control, being operable in response to feedback signals indicating the successful completion of a machine cycle to generate a cycle start signal to initiate a new cycle of operations by said workpiece support and said components.

12. A set of standardized control sections interconnectable to form controls for machines having motion producing components cyclically operable to perform work functions in a predetermined sequence in accordance with predetermined interlock conditions and means for providing interlock signals indicative of the positions of said components comprising, in combination,
- a plurality of standard unit sections and a standard master section, each of said sections including a plurality of NAND logic gate elements mounted on a card having a printed circuit operatively interconnecting said elements to provide standard circuits;
- the NAND logic gate elements of each unit section, when interconnected in a control, providing standard circuit means operable to generate control signals for controlling a corresponding component and standard interlock circuit means actuated by selected interlock signals for controlling the generation of said control signals;
- the NAND logic gate elements of each unit section further providing standard feedback circuit means interconnectable with feedback circuit means of other unit sections to form a feedback loop for generating feedback signals indicative of the successful completion of work functions by said components; and
- the NAND logic gate elements of said master section, when interconnected in a control, providing standard circuit means for generating a cycle start signal in response to the feedback signals indicating a successful completion of a full cycle of operation by said components, said control circuit means of each unit section being operable in response to said cycle start signal to initiate a new cycle of operation of said components.

13. A set of standardized control sections as defined in claim 12 wherein each standard unit section further comprises electrically isolated, auxiliary NAND logic gate elements interconnectable between the interlock circuit means of said unit section and selected interlock signal means of said machines to provide selected interlock signals to said interlock circuit means.

14. In an automatic control for machines having motion producing components operable to complete a cycle of advance and return motions for performing machine functions in a predetermined sequence in the presence of predetermined interlock conditions on workpieces carried by a movable workpiece support, the combination comprising a plurality of standard unit sections, each standard unit section having circuit means to generate control signals for directing the performance of an advance and a return motion by a corresponding component, interlock means actuated by selected interlock signals to control the generation of said control signals, and feedback means interconnected with the feedback means of other unit sections to form a feedback loop and operable to generate a set of feedback signals in response to the successful completion of an advance and a return motion by said corresponding component and to a set of feedback signals indicating that the corresponding components of the previous unit sections in said feedback loop have successfully completed their advance and return motions;

a standard index section having circuit means to generate a control signal for directing the indexing of said workpiece support and feedback means interconnected in said feedback loop to generate a set of feedback signals in response to the successful indexing of said workpiece support and to a set of feedback signals indicating that the corresponding components of the previous unit sections in said feedback loop have successfully completed their advance and return motions; and a standard master section operable to generate a cycle start signal in response to a set of feedback signals indicating that the motion producing components and the workpiece support have successfully completed their cycles of operation, said cycle start signal being effective to activate said standard index section and said standard unit sections to initiate a new cycle of operations.

15. In an automatic control as defined in claim 14, the combination further comprising means to transmit said cycle start signal to said index section and to said unit sections including means to delay the transmission of said cycle start signal to said unit sections until the successful indexing of said workpiece support so that said unit sections are able to generate said control signals only after said workpiece support is at rest and said workpieces are at their work stations.

16. In a control for machines having motion producing components cyclically operable to perform work functions in a predetermined sequence in accordance with predetermined interlock conditions and means for providing interlock signals indicative of the positions of said components, the combination comprising a plurality of standard unit sections and a standard master section, each of said sections including a plurality of NAND logic gate elements mounted on a card having a printed circuit operatively interconnecting said elements to provide standard circuits;

the NAND logic gate elements of each unit section providing standard circuit means operable to generate control signals for controlling a corresponding component and standard interlock circuit means actuated by selected interlock signals for controlling the generation of said control signals;

said NAND logic gate elements of each unit section further providing standard feedback circuit means interconnected with feedback circuit means of other unit sections to form a feedback loop and operable to generate feedback signals in response to interlock signals indicative of the successful completion of a work function by said corresponding component and to feedback signals indicative of the successful completion of work functions by the corresponding components of the prior unit sections in said feedback loop; and the NAND logic gate elements of said standard master section providing standard circuit means for generating a cycle start signal in response to feedback signals indicating a successful completion of a full cycle of operation by said components, said control circuit means of each unit section being responsive to said cycle start signal to initiate a new cycle of operation of said components.

17. In a control as defined in claim 16, each standard unit section further comprising electrically isolated, auxiliary NAND logic gate elements interconnectable between the interlock circuit means of said unit section and selected interlock signals means of said machines to provide selected interlock signals to said interlock circuit means.

18. A set of interconnectable standarized control sections for assembling controls for machines having motion producing components operable each machine cycle in repetitive advance and return cycles to perform work functions in a predetermined sequence in accordance with predetermined interlock conditions comprising, in combination:

a plurality of standard unit sections and a standard master section, each of said unit sections including a card with a multiplicity of circuit elements mounted on said card and a printed circuit interconnecting said elements to form a primary logic circuit and auxiliary logic circuitry electrically isolated from said primary logic circuit;

the primary logic circuit elements of said unit section comprising a circuit means for generating control signals for controlling a corresponding motion producing component, and the auxiliary logic circuitry comprising circuit means actuated by selected interlock signals to control the generation of said control signals to coordinate the operation of said components to perform work functions in said predetermined sequence in the presence of predetermined interlock conditions and the primary logic circuit elements of each unit section further comprising circuit means for generating feedback signals representing successful completion of machine functions by a set of set components including the component corresponding to the respective unit sections; and said standard master section including a card with a multiplicity of circuit elements mounted thereon and a printed circuit interconnecting said elements to form a master logic circuit interconnected with said unit primary logic circuit elements for generating a cycle start signal in response to said feedback signals representing successful completion of a full cycle of work functions by said components, said cycle start signal being effective to activate each unit section to generate control signals to automatically initiate a new cycle of operation by said components.

19. In a control for a machine having a plurality of motion producing components operable to perform work functions, the combination comprising a plurality of standard unit cards comprising:

a printed circuit card including a printed primary circuit with terminals for input and output signals and a printed auxiliary circuit with terminals for input and output signals;

said primary circuit including a set of logic gate elements to combine input feedback signals indicative of the progress of performance of work functions by a set of set components and interlock signals indicative of the progress of performance of a work function by said corresponding components and to produce output feedback signals and a set of logic gate elements and amplifying means to combine interlock signals and input directive signals and to produce output control signals for controlling the performance of a work function by said corresponding component, said auxiliary circuit including a plurality of electrically isolated logic gate elements adapted for interconnection in said primary circuit of said standard unit card and in said primary circuits of said other standard unit cards to increase the flexability and control capabilities of said control; and a standard master card comprising a printed circuit card including a printed automanual circuit including a set of logic gate elements to generate an automanual directive signal operable to establish automatic or manual operation by said control; and a printed cycle start circuit having input and output terminals and including a set of logic gate elements operable in response to a set of input feedback signals indicating that said components have successfully completed their work functions and to said automanual signal indicating automatic operation by said control to generate a cycle start directive signal operable to initiate an automatic cycle of work functions by said components;

the feedback output terminals of certain of said unit cards being connected to the feedback input terminals of other unit cards and the feedback output terminals of one unit card being connected to the feedback input terminals of the master card to form a feedback loop for providing said set of input feedback signals to said master card for generating said cycle start signal upon successful completion of a cycle of work functions by said components.

20. In a control for a machine having a plurality of motion producing components operable to perform work functions, the combination comprising a plurality of standard unit cards comprising:

a printed circuit card including a printed primary circuit with terminals for input and output signals and a printed auxiliary circuit with terminals for input and output signals; said primary circuit including a set of logic gate elements to combine input feedback signals indicative of the progress of performance of work functions by a set of set components and interlock signals indicative of the progress of performance of a work function by said corresponding components and to produce output feedback signals and a set of logic gate elements and amplifying means to combine interlock signals and input directive signals and to produce output control signals for controlling the performance of a work function by said corresponding component, said auxiliary circuit including a plurality of electrically isolated logic gate elements adapted for interconnection in said primary circuit of said standard unit card and in said primary circuits of said other standard unit cards to increase the flexibility and control capabilities of said control, and a standard master card comprising a printed circuit card including a printed automanual circuit including a set of logic gate elements to generate an automanual directive signal operable to establish automatic or manual operation by said control; and a printed cycle start circuit having input and output terminals and including a set of logic gate elements operable in response to a set of input feedback signals indicating that said components have successfully completed their work functions and to said automanual signal indicating automatic operation by said control to generate a cycle start directive signal operable to initiate an automatic cycle of work functions by said components;

each of said unit cards being connected to operate a corresponding component by connections from said control signal output terminals to said corresponding component and to receive input signals at interlock signal input terminals from said corresponding component.

* * * * *